United States Patent
Kamba et al.

(10) Patent No.: US 10,508,712 B2
(45) Date of Patent: Dec. 17, 2019

(54) FRICTION TRANSMISSION BELT AND MANUFACTURING METHOD THEREOF

(71) Applicant: Mitsuboshi Belting Ltd., Kobe-shi, Hyogo (JP)

(72) Inventors: Yuji Kamba, Hyogo (JP); Hiroki Imai, Hyogo (JP)

(73) Assignee: Mitsuboshi Belting Ltd., Kobe-shi, Hyogo (JP)

( * ) Notice: Subject to any disclaimer, the term of this patent is extended or adjusted under 35 U.S.C. 154(b) by 77 days.

(21) Appl. No.: 15/523,125

(22) PCT Filed: Oct. 30, 2015

(86) PCT No.: PCT/JP2015/080842
§ 371 (c)(1),
(2) Date: Apr. 28, 2017

(87) PCT Pub. No.: WO2016/068337
PCT Pub. Date: May 6, 2016

(65) Prior Publication Data
US 2017/0314641 A1    Nov. 2, 2017

(30) Foreign Application Priority Data

Oct. 31, 2014 (JP) ................... 2014-223772
Dec. 25, 2014 (JP) ................... 2014-262804
Oct. 22, 2015 (JP) ................... 2015-208209

(51) Int. Cl.
*F16G 5/20* (2006.01)
*C08L 23/16* (2006.01)
(Continued)

(52) U.S. Cl.
CPC ............. *F16G 5/20* (2013.01); *B29D 29/106* (2013.01); *C08K 3/04* (2013.01); *C08L 23/16* (2013.01);
(Continued)

(58) Field of Classification Search
CPC . C08L 23/16; C08L 23/06; C08K 7/02; F16G 5/20; B29D 29/103
(Continued)

(56) References Cited

U.S. PATENT DOCUMENTS 7,135,082 B2    11/2006   Hara et al.
8,632,650 B2     1/2014   Mori et al.
(Continued)

FOREIGN PATENT DOCUMENTS

CN    101076679 A    11/2007
CN    103168184 A     6/2013
(Continued)

OTHER PUBLICATIONS

Apr. 18, 2017—(JP) Notification of Reasons for Refusal—App 2015-208209.
(Continued)

*Primary Examiner* — Henry Y Liu
(74) *Attorney, Agent, or Firm* — Banner & Witcoff, Ltd.

(57) ABSTRACT

The present invention relates to a frictional power transmission belt containing a compression layer having a power transmission surface, at least a part of which is capable of coming into contact with a pulley, in which the compression layer contains a polymer component and a polyvinyl alcohol-based resin.

21 Claims, 5 Drawing Sheets

(51) Int. Cl.
*C08L 29/04* (2006.01)
*C08L 101/00* (2006.01)
*F16G 1/08* (2006.01)
*F16G 5/06* (2006.01)
*B29D 29/10* (2006.01)
*C08K 3/04* (2006.01)
*F16G 1/10* (2006.01)
*F16G 1/28* (2006.01)
*F16G 5/08* (2006.01)
*B29K 29/00* (2006.01)
*B29K 105/00* (2006.01)

(52) U.S. Cl.
CPC ............ *C08L 29/04* (2013.01); *C08L 101/00* (2013.01); *F16G 1/08* (2013.01); *F16G 1/10* (2013.01); *F16G 1/28* (2013.01); *F16G 5/06* (2013.01); *F16G 5/08* (2013.01); *B29K 2029/04* (2013.01); *B29K 2105/251* (2013.01)

(58) Field of Classification Search
USPC .......................................... 474/263, 264, 268
See application file for complete search history.

(56) References Cited

U.S. PATENT DOCUMENTS

| | | | |
|---|---|---|---|
| 8,888,635 B2 | 11/2014 | Mori et al. | |
| 9,011,283 B2 | 4/2015 | Shiriike | |
| 9,341,233 B2 | 5/2016 | Mori et al. | |
| 9,453,554 B2 | 9/2016 | Mori et al. | |
| 2004/0058767 A1* | 3/2004 | Hara | B29D 29/08 |
| | | | 474/263 |
| 2009/0048048 A1* | 2/2009 | Nakamura | B29D 29/103 |
| | | | 474/263 |
| 2010/0167860 A1* | 7/2010 | Mori | B29D 29/103 |
| | | | 474/252 |
| 2010/0173740 A1 | 7/2010 | Mori et al. | |
| 2010/0240809 A1* | 9/2010 | Yamada | C08L 23/0815 |
| | | | 524/81 |
| 2013/0237354 A1* | 9/2013 | Shiriike | F16G 5/06 |
| | | | 474/148 |
| 2014/0135161 A1 | 5/2014 | Mori et al. | |
| 2014/0364262 A1 | 12/2014 | Mori et al. | |
| 2015/0369335 A1* | 12/2015 | Ishiguro | C08K 7/02 |
| | | | 474/260 |

FOREIGN PATENT DOCUMENTS

| | | |
|---|---|---|
| EP | 0109990 A1 | 6/1984 |
| EP | 0896981 A1 | 2/1999 |
| JP | H10-237226 A | 9/1998 |
| JP | 2004-082702 A | 3/2004 |
| JP | 2004-162897 A | 6/2004 |
| JP | 2006-118661 A | 5/2006 |
| JP | 2008-082538 A | 4/2008 |
| JP | 2008-156806 A | 7/2008 |
| JP | 2008-157445 A | 7/2008 |
| JP | 2008-185162 A | 8/2008 |
| JP | 2011-099457 A | 5/2011 |
| JP | 2013-113343 A | 6/2013 |
| JP | 2013-253700 A | 12/2013 |
| JP | 2014-109009 A | 6/2014 |
| JP | 2014-167347 A | 9/2014 |
| WO | 2011-114727 A1 | 9/2011 |

OTHER PUBLICATIONS

Jul. 26, 2018—(CN) Notification of First Office Action—App 201580059231.2.
Jan. 26, 2016—International Search Report—Intl App PCT/JP2015/080842.
Jun. 1, 2018—(EP) Extended European Search Report—App 15854588.9.
Sep. 5, 2017—(JP) Notification of Reasons for Refusal—App 2015-245581.
Feb. 11, 2019—(CN) Notification of the Second Office Action—App 201580059231.2.

* cited by examiner

[FIG. 1]
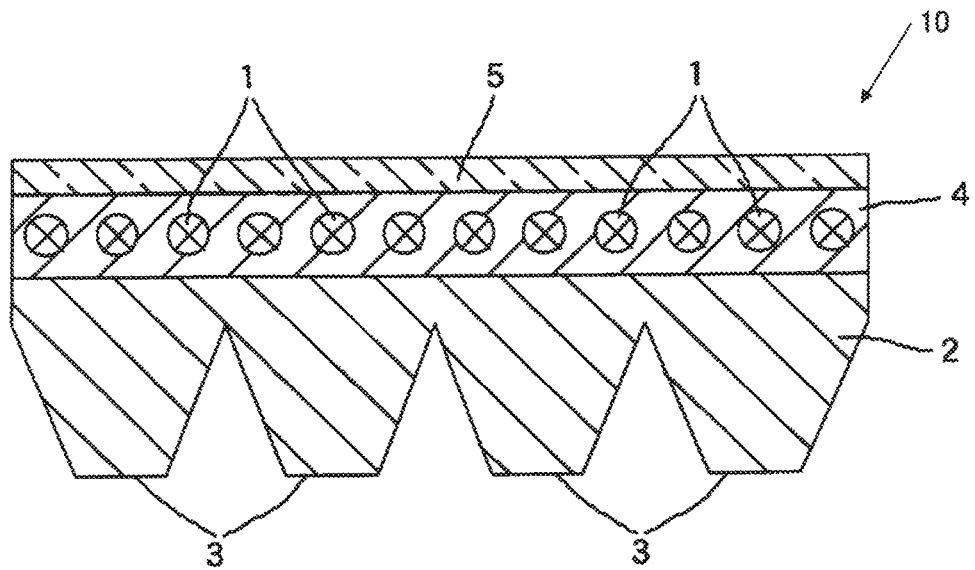
[FIG. 2]
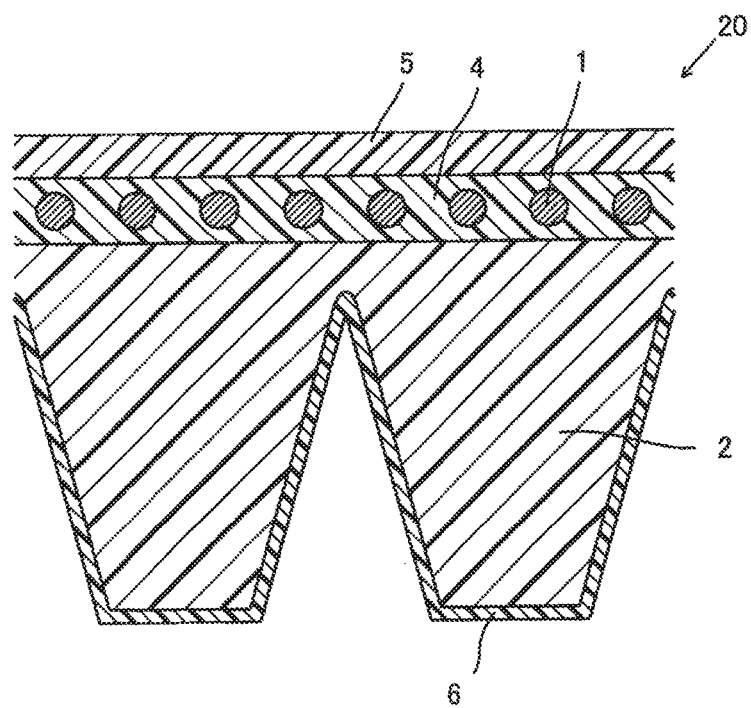

[FIG. 3]
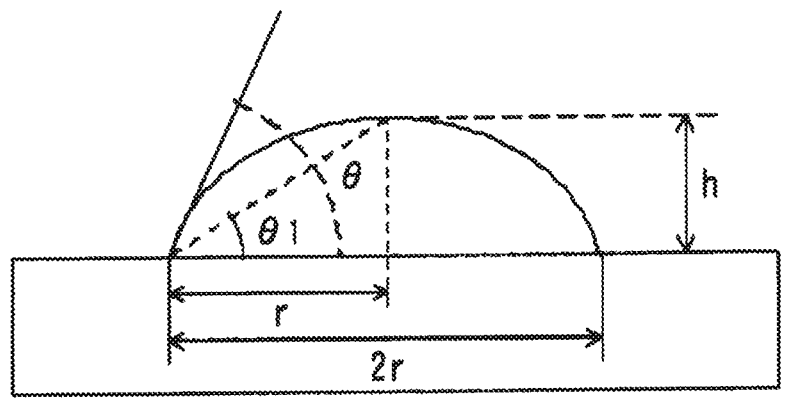
[FIG. 4]
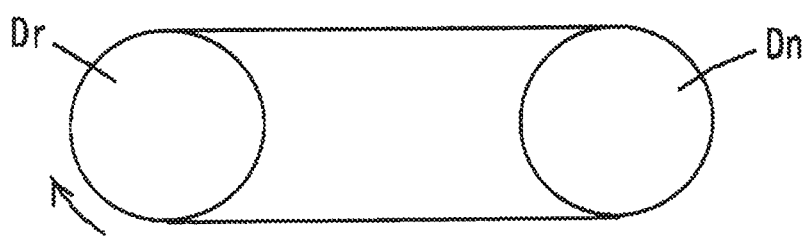

[FIG. 5]
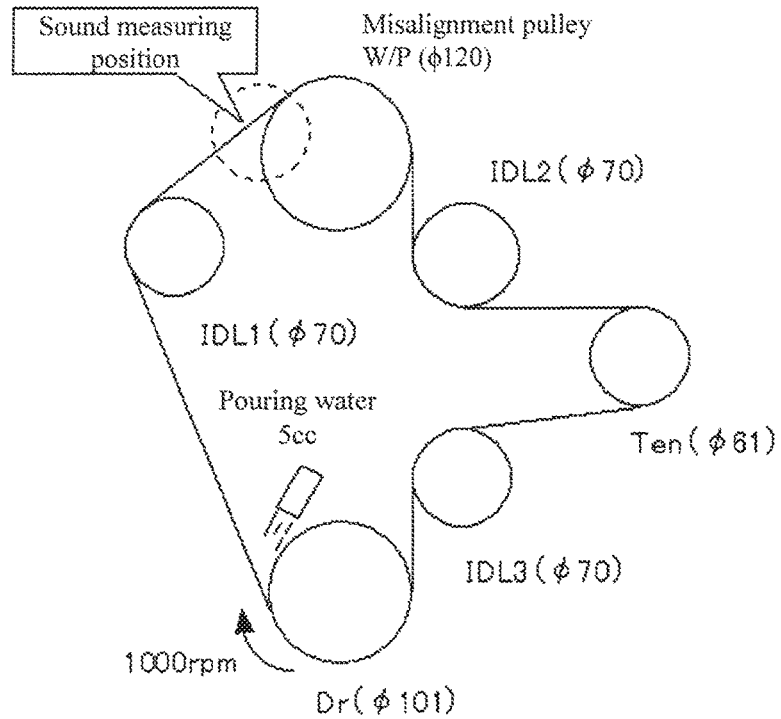
[FIG. 6]
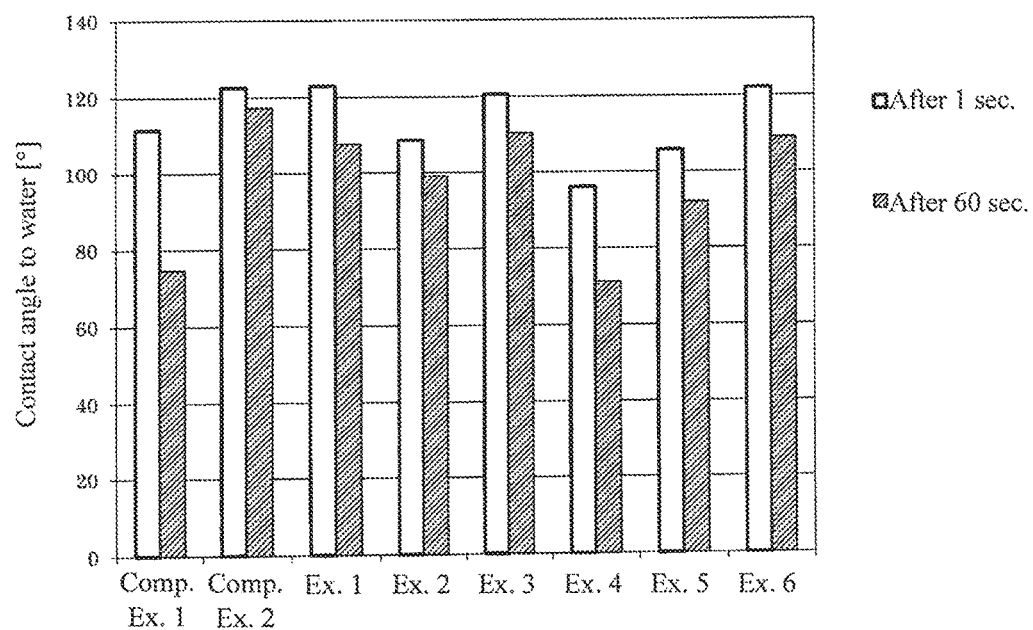

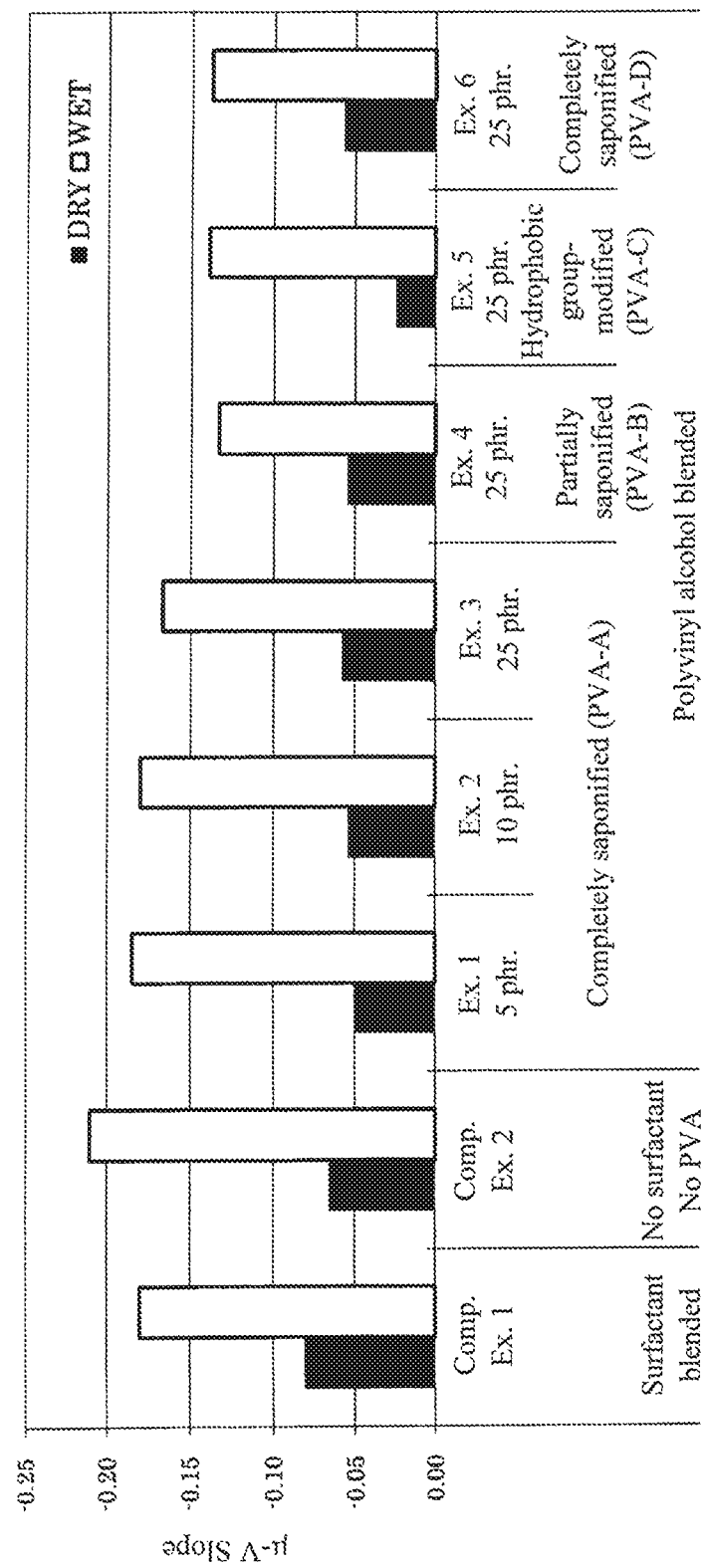

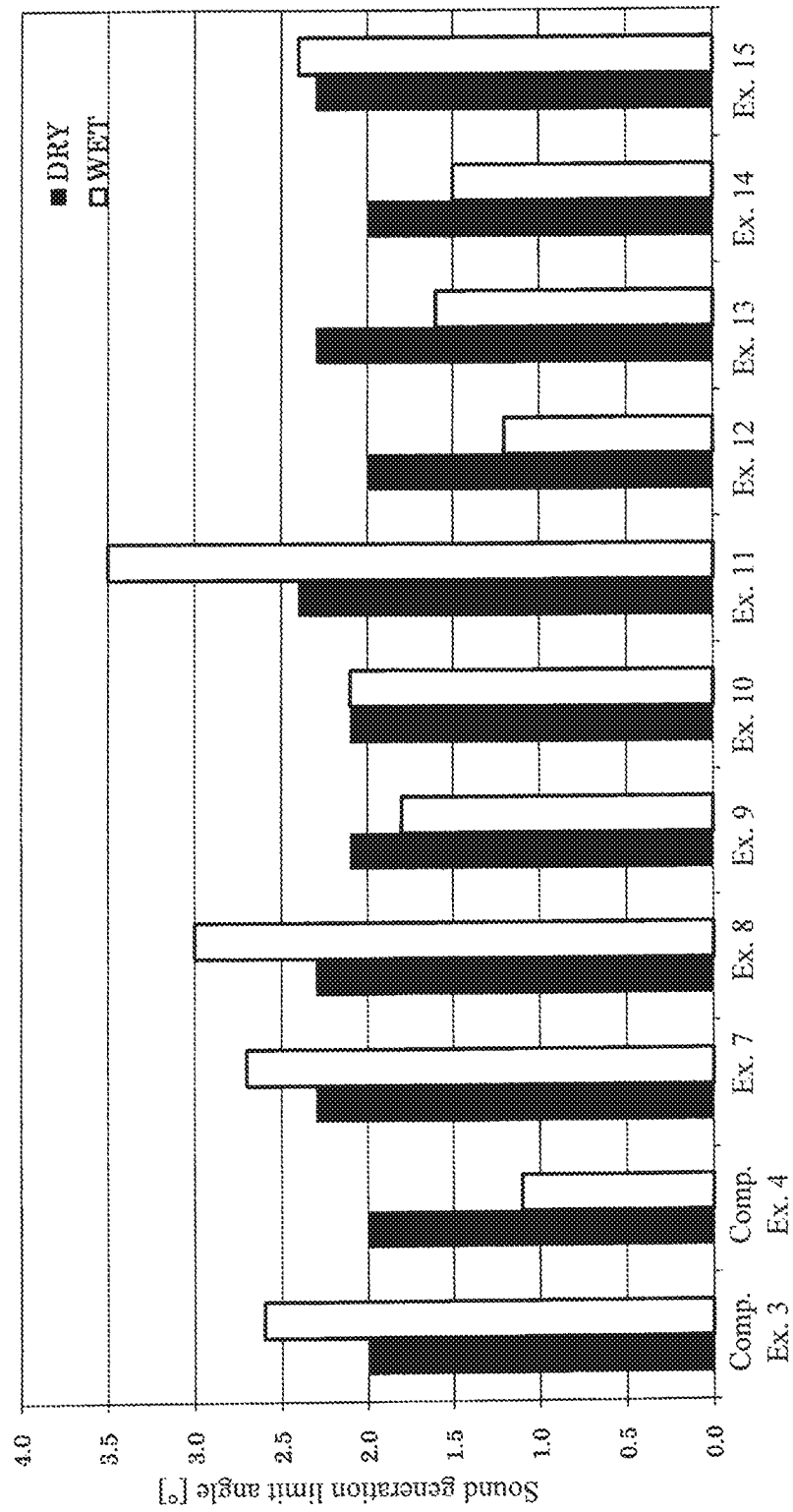
[FIG. 8]

FRICTION TRANSMISSION BELT AND MANUFACTURING METHOD THEREOF

CROSS REFERENCE TO RELATED APPLICATIONS:

This is a U.S. National Phase Application under 35 U.S.C. § 371 of International Application No. PCT/JP2015/080842, filed Oct. 30, 2015, which claims priority to Japanese Application No. 2014-223772, filed Oct. 31, 2014, Japanese Application No. 2015-262804, filed Dec. 25, 2014, and Japanese Application No. 2015-208209, filed Oct. 22, 2015, and which incorporates the contents of Japanese Application No. 2015-245581, filed Dec. 16, 2015, and which was published Under PCT Article 21(2), the entire contents of which are incorporated herein by reference.

TECHNICAL FIELD

The present invention relates to a frictional power transmission belt to be used for driving automobile engine auxiliary machines. More specifically, it relates to a frictional power transmission belt capable of stabilizing a friction state of a frictional power transmission surface to improve sound generation resistance while maintaining belt performance such as fuel-saving performance and abrasion resistance, and to a manufacturing method thereof.

BACKGROUND ART

In the field of rubber industry, especially, automobile components are desired to have advanced function and performance. A frictional power transmission belt is one of rubber products used in such automobile components, and the frictional power transmission belt is widely used for, for example, power transmission of auxiliary drive of automobile air compressors, alternators and the like. Although a V-ribbed belt having ribs provided along a belt longitudinal direction has been known as the belt of this kind, sound generation resistance is required for the V-ribbed belt, in addition to the belt performance such as fuel-saving performance and abrasion resistance. Particularly, in running at the time when exposed to water, generation of stick-slip sound becomes a problem. Specifically, if wettability of the frictional power transmission surface is low and a water penetration condition between the belt and pulleys is uneven, a friction coefficient is high at a portion to which water does not penetrate (dry state) and a friction coefficient remarkably decreases partially at a portion to which water penetrates (water-exposed state), so that the friction state becomes unstable and the stick-slip sound is generated.

Patent Document 1 discloses a frictional power transmission belt in which at least a frictional power transmission surface is composed of a rubber composition in which 1 to 25 parts by mass of a surfactant is blended relative to 100 parts by mass of an ethylene-α-olefin elastomer. As for this frictional power transmission belt, affinity of the rubber (ethylene-α-olefin elastomer) forming the frictional power transmission surface to water can be enhanced by blending the surfactant and thus, abnormal noise caused by stick-slip can be reduced to improve the sound generation resistance when exposed to water.

However, in this belt, although the surfactant oozed out on the frictional power transmission surface stabilizes the friction state between the belt and the pulleys, probably because of unstable behavior of the surfactant in the rubber, internal loss (tan δ) increases and torque loss becomes large. In addition, rubber strength decreases and thus there is a concern that the abrasion resistance cannot be maintained. Furthermore, in the case where the surfactant is blended all over the compression rubber layer, there is also a concern of a decrease in mechanical characteristics (strength, elongation, etc.) of the compression rubber layer.

Patent Document 2 discloses a power transmission belt having a compression rubber layer provided at the belt bottom side of a tension member, in which short fibers composed of a gellable polyvinyl alcohol fiber subjected to an RFL treatment are embedded in the compression rubber layer so as to be exposed on the surface of the compression rubber layer. This document describes that, even when a large amount of water enters, a water film is broken through and thus a decrease in power transmission ability and generation of abnormal noise, which may be caused by slipping resulting from a water layer generated at an interface between the belt and the pulleys, are prevented by water absorption and gelation of the exposed polyvinyl alcohol short fibers. Furthermore, in Examples, the belt was rotated on a two-axle testing machine and sound generation limit tension during water pouring was measured as evaluation of sounding performance.

However, since the short fibers contained in this power transmission belt are gellable polyvinyl alcohol fibers, sound generation resistance cannot be improved. That is, in Examples of Patent Document 2, a load at 2% slipping during water pouring was measured but the load becomes large as compared with Comparative Examples (Nylon short fibers were blended) and the friction coefficient during water pouring increased. However, in an actual vehicle engine, because of rotational fluctuation, if the friction coefficient during water pouring is high, the sound generation by stick-slip is prone to occur. Therefore, it is necessary to enhance affinity of a rubber forming the frictional power transmission surface to water and to form a uniform water film so as to decrease the friction coefficient during water pouring and also to decrease a change in the friction coefficient to a slip rate. In the short fibers of Patent Document 2, however, since the water-absorbed and gelled short fibers protrudes on the frictional power transmission surface and breaks through and removes the water film, a uniform water film itself cannot be formed and thus a friction state cannot be stabilized. Therefore, in the actual vehicle engine having rotational fluctuation, the sound generation resistance is not sufficient.

Moreover, the gelled short fibers are presumed to be softened due to water absorption but, since the short fibers that have protruded are abraded at the time of belt power transmission, the abrasion resistance cannot be also maintained.

Furthermore, the short fibers are difficult to disperse into the compression rubber layer as compared to particles, and processability is low. In addition, since the short fibers dispersed in the rubber have small contact area with the rubber and have a smooth contact surface, adhesiveness to the rubber decreases and thus a surface treatment such as a resorcin-formalin-latex (RFL) treatment becomes necessary for improving adhesive force. In addition, since the short fibers are blended all over the compression rubber layer, there is a concern of a decrease in mechanical characteristics.

Patent Document 3 discloses a frictional power transmission belt in which at least a part of a frictional power transmission surface is composed of a rubber composition containing from 5 to 50 parts by mass of a water-soluble polymer having a melting point or a softening point of 80°

C. or lower relative to 100 parts by mass of a rubber. In this document, as the water-soluble polymer, polyethylene oxide is described.

However, this water-soluble polymer melts at the time of vulcanization of the belt and hence, is dispersed in all over the compression rubber layer, but the internal loss (tan δ) increases and the torque loss becomes large probably because the molten water-soluble polymer inhibits cross-linking of the rubber. Moreover, since the water-soluble polymer is blended all over the compression rubber layer, there is a concern of a decrease in mechanical characteristics. Incidentally, in Examples of Patent Document 3, polyvinyl alcohol was blended as a water-soluble polymer but the case is described as Comparative Example in which sound generation limit tension during water pouring is low and also details thereof are unknown.

Patent Document 4 discloses a frictional power transmission belt comprising a compression rubber layer that comes into contact with pulleys to transmit power, in which the compression rubber layer has a surface rubber layer having a relatively large content of a plasticizer and containing a particulate ultrahigh molecular weight polyethylene resin and an inner rubber layer having a relatively small content of a plasticizer. In addition, Patent Document 5 discloses a frictional power transmission belt containing a compression rubber layer having a frictional power transmission surface for engaging with or coming into contact with pulleys, in which a lubricant formed of a polyethylene-based resin is attached to the frictional power transmission surface.

However, with the polyethylene-based resin such as the ultrahigh molecular weight polyethylene resin, the sound generation resistance and the abrasion resistance can be improved by reducing the friction coefficient but sound generation at the time when exposed to water cannot be suppressed at a high level.

PRIOR ART DOCUMENT

Patent Document

Patent Document 1: JP-A-2008-185162
Patent Document 2: JP-A-2006-118661
Patent Document 3: JP-A-2008-157445
Patent Document 4: WO 2011/114727
Patent Document 5: JP-A-2013-113343

SUMMARY OF THE INVENTION

Problems That the Invention is to Solve

Accordingly, an object of the present invention is to provide a frictional power transmission belt capable of stabilizing a friction state of a frictional power transmission surface to improve sound generation resistance while maintaining belt performance such as fuel-saving performance and abrasion resistance, and to a manufacturing method thereof.

Another object of the present invention is to provide a frictional power transmission belt capable of suppressing sound generation caused by slipping between a frictional power transmission surface and pulleys at the time when exposed to water, while maintaining belt performance such as strength and elongation, and to a manufacturing method thereof.

Still another object of the present invention is to provide a frictional power transmission belt capable of improving sound generation resistance while maintaining belt performance such as abrasion resistance, and to a manufacturing method thereof.

Means for Solving the Problems

As a result of extensive studies for achieving the above objects, the present inventors have found that, in the case where a compression layer of a frictional power transmission belt is formed of a rubber composition containing a polymer component and a polyvinyl alcohol-based resin, a friction state of a frictional power transmission surface can be stabilized to improve sound generation resistance while maintaining belt performance such as fuel-saving performance and abrasion resistance, and thus they have accomplished the present invention.

That is, the frictional power transmission belt of the present invention is a frictional power transmission belt containing a compression layer having a power transmission surface, at least a part of which is capable of coming into contact with a pulley, in which the compression layer contains a polymer component and a polyvinyl alcohol-based resin.

The compression layer preferably has a surface layer containing a polyvinyl alcohol-based resin on the surface of the power transmission surface. Moreover, the surface layer is preferably formed of a rubber composition containing the polymer component and the polyvinyl alcohol-based resin or formed of the polyvinyl alcohol-based resin. The compression layer preferably contains the polyvinyl alcohol-based resin only in the surface layer.

The polyvinyl alcohol-based resin is preferably polyvinyl alcohol-based resin particles. The polyvinyl alcohol-based resin particles preferably have an average aspect ratio of 10 or less.

A vinyl alcohol unit of the polyvinyl alcohol-based resin preferably has a saponification degree of about from 86 to 97% by mol.

The polyvinyl alcohol-based resin preferably has a viscosity-average polymerization degree of about from 300 to 3,500.

The polyvinyl alcohol-based resin preferably has a melting point higher than vulcanization temperature of the belt.

The polyvinyl alcohol-based resin preferably has a solubility in water of 60% by mass or higher at 20° C.

The polyvinyl alcohol-based resin is preferably polyvinyl alcohol-based resin particles modified with a hydrophobic group.

In the compression layer, the ratio of the polyvinyl alcohol-based resin is preferably about from 5 to 30 parts by mass relative to 100 parts by mass of the polymer component.

The polyvinyl alcohol-based resin is preferably dispersed and exposed on the frictional power transmission surface.

The compression layer preferably further contains a reinforcing material.

The polymer component is preferably an ethylene-α-olefin elastomer.

It is preferred that the frictional power transmission belt of the present invention further contains a tension member and a tension layer forming the back face of the belt, the compression layer is formed on one surface of the tension layer, and the tension member is embedded along a belt longitudinal direction between the tension layer and the compression layer.

The frictional power transmission belt of the present invention is preferably a V-ribbed belt.

Moreover, the manufacturing method of the frictional power transmission belt according to the present invention contains:

a compression layer winding step of winding an unvulcanized rubber sheet on a cylindrical drum, and a vulcanization and formation step of pushing the unvulcanized rubber sheet against a mold and vulcanizing the sheet, in which a surface layer is formed in either step of the compression layer winding step and the vulcanization and formation step.

It is preferred that, in the compression layer winding step, a lamination sheet of an unvulcanized rubber layer for forming the surface layer and an unvulcanized rubber layer for forming the compression layer is used as the unvulcanized rubber sheet.

It is preferred that, in the compression layer winding step, a sheet obtained by applying polyvinyl alcohol-based resin particles on a surface of an unvulcanized rubber sheet for forming the compression layer is used as the unvulcanized rubber sheet.

It is preferred that, in the vulcanization and formation step, a mold obtained by applying polyvinyl alcohol-based resin particles on the surface to be contact with the unvulcanized rubber sheet is used as the mold.

Advantageous Effect of the Invention

In the present invention, since a polymer component and a polyvinyl alcohol-based resin are incorporated into a compression layer in combination, a friction state of a frictional power transmission surface can be stabilized to improve sound generation resistance (particularly sound generation resistance at the time when exposed to water) while maintaining belt performance such as fuel-saving performance and abrasion resistance (with no occurrence of performance deterioration caused by crosslinking inhibition of rubber). Particularly, probably because polyvinyl alcohol-based resin particles moderately dissolve in water and form a uniform water film on the frictional power transmission surface, sound generation caused by slipping between the frictional power transmission surface and pulleys can be suppressed at the time when exposed to water.

Moreover, in the case where a surface layer containing a polyvinyl alcohol-based resin is laminated on the surface of the power transmission surface of the compression rubber layer of the frictional power transmission belt, the friction state of the frictional power transmission surface can be stabilized to improve sound generation resistance (particularly sound generation resistance at the time when exposed to water). In this case, particularly, since the surface layer contains the polyvinyl alcohol-based resin, probably because the polyvinyl alcohol-based resin moderately dissolves in water and form a uniform water film on the frictional power transmission surface, sound generation caused by slipping between the frictional power transmission surface and pulleys can be suppressed at the time when exposed to water while maintaining mechanical characteristics such as strength and elongation.

BRIEF DESCRIPTION OF DRAWINGS

FIG. 1 is a schematic cross-sectional view illustrating one example of the V-ribbed belt of the present invention.

FIG. 2 is a schematic cross-sectional view illustrating another example of the V-ribbed belt of the present invention.

FIG. 3 is a schematic view for explaining a measurement method of a contact angle in Examples.

FIG. 4 is a schematic view for explaining a measurement method of torque loss in Examples.

FIG. 5 is a schematic view for explaining a misalignment sound generation test in Examples.

FIG. 6 is a graph showing contact angles to water on the vulcanized rubber sheets obtained in Examples.

FIG. 7 is a graph showing a relationship between a friction coefficient and a slip rate of each of the vulcanized rubber sheets obtained in Examples.

FIG. 8 is a graph showing sound generation limit angles of the belts obtained in Examples.

MODE FOR CARRYING OUT THE INVENTION

The following will explain structure of the frictional power transmission belt of the present invention with appropriately referencing to Drawings, and manufacturing method of the frictional power transmission belt of the present invention.

[Structure of Frictional Power Transmission Belt]

The frictional power transmission belt of the present invention usually contains a tension layer, a compression layer formed on one surface of the tension layer, and a tension member (cord) embedded along a belt longitudinal direction between the tension layer and the compression layer. Specifically, the frictional power transmission belt of the present invention may comprise a tension layer forming an outer circumferential surface, a compression layer formed on one surface of the tension layer and forming an inner circumferential surface, and a tension member intervening between the tension layer and the compression layer with extending in a longitudinal direction. Moreover, the frictional power transmission belt of the present invention may further contain an adhesion rubber layer (adhesion layer) intervening between the tension layer and the compression layer and the tension member may be embedded in the adhesion rubber layer.

The kind of the frictional power transmission belt of the present invention is not particularly limited and examples thereof include a V-belt [a raw-edge belt (raw-edge belt having a form such as a V-shaped cross section), a raw-edge cogged belt (raw-edge cogged belt in which cog is formed at an inner circumferential side or at both of the inner circumferential side and the outer circumferential side of a raw-edge belt)], a V-ribbed belt, a flat belt, and the like. Of these belts, a V-ribbed belt exhibiting high power transmission efficiency is preferred.

The form of the V-ribbed belt is not particularly limited and, for example, forms illustrated in FIG. 1 and FIG. 2 can be exemplified. FIG. 1 is a schematic cross-sectional view illustrating one example of the frictional power transmission belt of the present invention. The frictional power transmission belt 10 illustrated in FIG. 1 has a form in which a compression layer 2, an adhesion layer 4 in which a tension member 1 is embedded in the belt longitudinal direction, and a tension layer 5 composed of a cover canvas (woven fabric, knitted fabric, non-woven fabrics, etc.) are laminated from a belt bottom surface (inner circumferential surface) to a belt top surface (back face) in the order. In the compression layer 2, a plurality of grooves having a V-shaped cross-section, which extend in the belt longitudinal direction, are formed. A plurality of ribs 3 (four pieces in the example illustrated in FIG. 1) having a V-shaped cross-section (inverted trapezoid) are formed between the grooves, and two inclined faces (surface) of the ribs 3 form the frictional power transmission surface and come into contact with pulleys to transmit power (frictional power transmission).

FIG. 2 is a schematic cross-sectional view illustrating another example of the frictional power transmission belt of the present invention. The frictional power transmission belt 20 illustrated in FIG. 2 is different from the frictional power transmission belt 10 illustrated in FIG. 1 in the point that a surface layer 6 is present on the surface of the compression layer 2.

The frictional power transmission belt of the present invention is not limited to this form. It is sufficient that the belt contains a compression layer having a power transmission surface, at least a part of which is capable of coming into contact with a pulley. Typically, it is sufficient that the belt contains a tension layer, a compression layer, and a tension member embedded between them along the belt longitudinal direction. In the frictional power transmission belt of the present invention, for example, the tension layer 5 may be formed of a rubber composition, or the tension member 1 may be embedded between the tension layer 5 and the compression layer 2 without providing the adhesion layer 4. Furthermore, the belt may have a form where the adhesion layer 4 is provided on either the compression layer 2 or the tension layer 5 and the tension member 1 is embedded between the adhesion layer 4 (compression layer 2 side) and the tension layer 5 or between the adhesion layer 4 (tension layer 5 side) and the compression layer 2. Moreover, the belt may have a form where powdery fibers (e.g., cotton, nylon, aramid, etc.) are flocked on a surface of the rib 3 (particularly, a frictional power transmission surface) or a form where a lubricant or the like is sprayed.

Incidentally, it is sufficient that at least the compression layer is formed of a rubber composition to be described in detail below, and the tension layer and the adhesion layer may not be formed of the same rubber composition as that of the compression layer. It is not necessary that the rubber composition forming the tension layer and the adhesion layer contains polyvinyl alcohol-based resin particles.

The tension member is not particularly limited but usually, cords (twisted cords) aligned at a predetermined intervals in the belt width direction can be used. As the cords, there are widely used a high modulus fiber, for example, a synthetic fiber such as a polyester fiber (polyalkylene arylate-based fiber) or an aramid fiber, an inorganic fiber such as a carbon fiber, or the like, and a polyester fiber (polyethylene terephthalate-based fiber, polyethylene naphthalate-based fiber) and an aramid fiber are preferred. The fiber may be a multifilament yarn, for example, a multifilament yarn having a fineness of about from 2,000 to 10,000 denier (particularly, 4,000 to 8,000 denier).

As the cord, use can be usually made of a twisted cord (e.g., plied, single twist, Lang lay, etc.) using a multifilament yarn. The average cord diameter of the cord (fiber diameter of the twisted cord) may be about, for example, from 0.5 to 3 mm, preferably from 0.6 to 2 mm, and more preferably from 0.7 to 1.5 mm. The cord may be embedded in the belt longitudinal direction, and a single cord or a plurality of cords may be multiply embedded in parallel at a predetermined pitch in the belt longitudinal direction.

In order to improve the adhesiveness to a polymer component, the cord may be embedded between the tension layer and the compression layer (particularly, the adhesion layer) after subjected to various adhesion treatments with an epoxy compound, an isocyanate compound, or the like.

Furthermore, the tension layer may have a reinforcing fabric, for example, a fabric such as a woven fabric, wide-angle canvas, a knitted fabric, and a non-woven fabric (preferably a woven fabric). The reinforcing fabric may be subjected to an adhesion treatment, if necessary, and then be laminated on the surface of the tension rubber layer.

[Compression Layer]

The frictional power transmission belt of the present invention contains a compression layer having a power transmission surface, at least a part of which is capable of coming into contact with a pulley, and the compression layer contains a polymer component and a polyvinyl alcohol-based resin. The compression layer may have a surface layer containing the polyvinyl alcohol-based resin on the surface. In the case where the compression layer has the surface layer, the polyvinyl alcohol-based resin may be present all over the compression layer or may be present only in the surface layer. Moreover, the surface layer may be a surface layer (single layer) formed of the polyvinyl alcohol-based resin or may be a surface layer (composite layer) formed of a rubber composition containing the polyvinyl alcohol-based resin and the polymer component. Incidentally, the surface layer will be described later.

(Polymer Component)

Examples of the polymer component include known rubber components and/or elastomers, for example, diene-based rubbers [natural rubber, isoprene rubber, butadiene rubber, chloroprene rubber, styrene-butadiene rubber (SBR), acrylonitrile-butadiene rubber (nitrile rubber), hydrogenated nitrile rubber (including a mixed polymer of hydrogenated nitrile rubber and an unsaturated carboxylic acid metal salt), etc.], ethylene-α-olefin elastomers, chlorosulfonated polyethylene rubbers, alkylated-chlorosulfonated polyethylene rubbers, epichlorohydrin rubbers, acrylic rubbers, silicone rubbers, urethane rubbers, fluororubbers, and the like. These polymer components may be used alone or in combination of two or more kinds thereof. Of these polymer components, in view of containing no harmful halogen, having ozone resistance, heat resistance and cold resistance, and also being excellent in economical efficiency, ethylene-α-olefin elastomers (ethylene-α-olefin-based rubbers such as ethylene-propylene rubbers (EPR) and ethylene-propylene-diene copolymers (EPDM, etc.)) are preferred.

(Polyvinyl Alcohol-Based Resin)

In the present invention, since the polyvinyl alcohol-based resin is blended into the polymer component, the particles can be substantially uniformly dispersed and exposed without protrusion on a polished frictional power transmission surface. The polyvinyl alcohol-based resin may be present in a form of particles. The polyvinyl alcohol-based resin is water-soluble and can improve wettability of the frictional power transmission surface of the compression layer to water (affinity of rubber to water). Therefore, even when water penetrates during running, a water film may uniformly expand between the belt and pulleys and a friction state can be stabilized to suppress sound generation resulting from self-excited vibration. Particularly, even in the case where rotational fluctuation occurs as in the case of an actual car engine, a change in the friction coefficient with respect to a slip rate can be decreased and abnormal noise caused by stick-slip can be reduced to improve sound generation resistance when exposed to water. Furthermore, since the polyvinyl alcohol-based resin particles do not inhibit the reinforcing effect of the reinforcing material on the polymer component in the rubber composition forming the compression layer, internal loss (tan δ) can be kept low.

It is sufficient that the polyvinyl alcohol-based resin contains a vinyl alcohol unit as a main unit, and the resin may further contain other copolymerizable unit(s) in addition to the vinyl alcohol unit.

Examples of a monomer constituting the other copolymerizable unit(s) include olefins ($\alpha$-$C_{2-10}$ olefins such as ethylene, propylene, 1-butene, isobutene, and 1-hexene, etc.), unsaturated carboxylic acids [(meth)acrylic acid, (meth)acrylic acid $C_{1-6}$ alkyl esters such as methyl (meth) acrylate and ethyl (meth)acrylate, maleic acid (anhydride), etc.], vinyl ethers ($C_{1-6}$ alkyl vinyl ethers such as methyl vinyl ether, ethyl vinyl ether, and propyl vinyl ether, $C_{2-6}$ alkanediol-vinyl ethers such as ethylene glycol vinyl ether, 1,3-propanediol vinyl ether, and 1,4-butanediol vinyl ether, etc.), unsaturated sulfonic acids (ethylenesulfonic acid, allylsulfonic acid, etc.), and the like. These monomers may be used alone or in combination of two or more kinds thereof. Of these monomers, $\alpha$-$C_{2-4}$ olefins such as ethylene and propylene are widely used.

The ratio of the other copolymerizable unit(s) may be 50% by mol or less relative to the total units and may be about, for example, from 0 to 30% by mol, preferably from 0.1 to 20% by mol, and further preferably about from 1 to 10% by mol. The polyvinyl alcohol-based resin may be a homopolymer composed of a vinyl alcohol unit alone.

As for the polyvinyl alcohol-based resin, the vinyl alcohol unit may be modified with a hydrophobic group. Examples of the hydrophobic group include $C_{1-10}$ alkyl groups such as a methyl group, an ethyl group, a propyl group, an isopropyl group, a butyl group, an isobutyl group, and a hexyl group, cycloalkyl groups such as a cyclohexyl group, aryl groups such as a phenyl group, and the like. These hydrophobic groups may be used alone or in combination of two or more kinds thereof. Of these hydrophobic groups, $C_{2-4}$ alkyl groups such as an ethyl group and a propyl group are preferred.

In the present invention, by controlling the ratios of the copolymerizable unit(s) and the hydrophobic group, the solubility in water and the like of the polyvinyl alcohol-based resin can be controlled and thus torque loss can be suppressed.

The saponification degree of the vinyl alcohol unit in the polyvinyl alcohol-based resin may be 85% by mol or more and is about, for example, from 85 to 99.7% by mol, preferably from 86 to 97% by mol, and further preferably from 86.5 to 93% by mol (particularly from 86.5 to 89.5% by mol). In the present invention, from the standpoint of easy formation of a uniform water film on the frictional power transmission surface, a saponification degree of 97% by mol or less is preferred and a partially saponified product (from 86.5 to 89.5% by mol) is particularly preferred. The saponification degree of a completely saponified product may be 97.5% by mol or more (particularly 98% by mol or more).

The viscosity-average polymerization degree of the polyvinyl alcohol-based resin is about, for example, from 300 to 3,500, preferably 400 to 3,200, and further preferably 500 to 3,000. In the case where the polymerization degree is too large, it becomes difficult to form a uniform water film on the frictional power transmission surface. In the case where the degree is too small, there is a concern that it becomes difficult to maintain a uniform dispersion state, a layer form or a particle form. Incidentally, in the present invention, the viscosity-average polymerization degree can be measured by a method in accordance to JIS K6726 (1994) or the like.

It is sufficient that the melting point of the polyvinyl alcohol-based resin is higher than the vulcanization temperature of the belt and, for example, may be higher than the vulcanization temperature of the belt by 10° C. or more (particularly 50° C. or more). For example, the melting point of the polyvinyl alcohol-based resin may be 180° C. or higher and may be about, for example, from 180 to 300° C., preferably from 200 to 280° C., and further preferably from 210 to 250° C. In the case where the melting point is too low, the resin is melted by vulcanization and there is a concern that it becomes difficult to disperse it in the polymer component homogeneously or it becomes difficult to maintain a layer form.

The solubility of the polyvinyl alcohol-based resin in water at 20° C. may be 5% by mass or more (particularly 10% by mass or more), and may be about, for example, 30% by mass or more (particularly 50% by mass or more), preferably 60% by mass or more (e.g., from 60 to 99% by mass), and further preferably 80% by mass or more (e.g., from 80% to 95% by mass). When the belt is exposed to water, belt temperature during running decreases and therefore, in the case where the solubility at around ordinary temperature is too low, the wettability of the frictional power transmission surface in a lower temperature region (e.g., at around ordinary temperature) decreases and there is a concern of a decrease in the sound generation resistance.

In the case where the polyvinyl alcohol-based resin is in a particle form, the number-average particle diameter of the particles is about, for example, from 10 to 300 µm, preferably from 15 to 200 µm, and further preferably from 20 to 100 µm (e.g., from 50 to 100 µm). Moreover, from the standpoints that sound generation resistance (particularly sound generation resistance when exposed to water) can be improved and also drop-out of the particles and generation of cracks between the particles and the rubber during belt running can be suppressed, the number-average particle diameter of the polyvinyl alcohol-based resin may be relatively small particle diameter and may be about, for example, from 10 to 100 µm, preferably from 20 to 80 µm, and further preferably from 30 to 50 µm (particularly from 35 to 45 µm). The reason why particles having small particle diameter can improve sound generation resistance can be assumed to be that the wettability to water is improved due to the homogeneous dispersion and thus drop-out of the particles and the generation of the cracks between the particles and the rubber during belt running can be suppressed. In the case where the particle diameter is too large, there is a concern of a decrease in mechanical characteristics and durability of the compression layer. On the other hand, in the case where the particle diameter is too small, it becomes difficult to fill and disperse the particles in the polymer component homogeneously and thus there is a concern of a decrease in the sound generation resistance. In the present invention, the number-average particle diameter is represented as an average value of a long diameter and a short diameter in the case where the particles have an anisotropic shape.

The maximum particle diameter of the polyvinyl alcohol-based resin particles may be 500 µm or less and may be, for example, 400 µm or less, preferably 350 µm or less (e.g., 300 µm or less), and further preferably 200 µm or less (particularly 180 µm or less). The minimum particle diameter of the polyvinyl alcohol-based resin particles may be 1 µm or more and may be, for example, 3 µm or more, preferably 5 µm or more, and further preferably 8 µm or more. In the case where the maximum particle diameter is too large, there is a concern of a decrease in the sound generation resistance.

In the case where the polyvinyl alcohol-based resin is in a particle form, the average aspect ratio of the particles (ratio of the long diameter to the short diameter) may be 10 or less (e.g., from 1 to 10) and is about, for example, from 1 to 5, preferably from 1 to 3, and further preferably from 1 to 2 (e.g., from 1.2 to 1.9). Moreover, from the standpoint that the sound generation resistance when exposed to water can be improved, the aspect ratio of the polyvinyl alcohol-based resin particles may be about, for example, from 1.5 to 5, preferably from 1.6 to 3, and further preferably from 1.8 to 2.5. In the case where the aspect ratio is too large, stress concentration to an interface occurs at the time of deformation of the compression layer and there is a concern of a decrease in elongation at break of the compression layer.

Incidentally, in the present invention, the number-average particle diameter and the average aspect ratio can be measured by a method of measuring a size on the basis of a scanning electron microscope photograph taken at a magnification of 50.

In the case where the polyvinyl alcohol-based resin has a particle shape, shear and tensile stress concentration are difficult to occur at the interface between the rubber and the polyvinyl alcohol at the time of deformation of the compression layer. Therefore, even without conducting an adhesion treatment with an adhesive component such as a resorcin-formalin-latex (RFL) solution, the particles can be fixed in the polymer component. Moreover, the polyvinyl alcohol has a surface-active ability owing to the presence of an acetate group (hydrophobic group) in addition to the hydroxyl group (hydrophilic group) and thus can be easily homogeneously dispersed in the polymer component that forms the compression layer (or surface layer).

The ratio of the polyvinyl alcohol-based resin (particularly polyvinyl alcohol-based resin particles) is sufficiently about 1 part by mass or more relative to 100 parts by mass of the polymer component, and is about, for example, from 1 to 50 parts by mass, preferably from 3 to 40 parts by mass (e.g., from 5 to 30 parts by mass), and further preferably from 5 to 35 parts by mass (particularly from 10 to 30 parts by mass). Moreover, the ratio of the polyvinyl alcohol-based resin particles is preferably large from the standpoint that the sound generation resistance when exposed to water can be improved, and is preferably 10 parts by mass or more relative to 100 parts by mass of the polymer component, and may be about, for example, from 10 to 50 parts by mass, preferably from 15 to 40 parts by mass, and further preferably from 20 to 30 parts by mass. In the case where the ratio of the polyvinyl alcohol-based resin is too large, mechanical characteristics of the compression layer decreases and, in the case where the ratio is too small, there is a concern that the sound generation resistance decreases.

(Reinforcing Material)

The compression layer may contain a reinforcing material for improving the mechanical strength of the compression layer. As the reinforcing material, conventionally used fillers, reinforcing fibers and the like are included.

Examples of the fillers include carbonaceous materials (carbon black, graphite, etc.), metal compounds or synthetic ceramics (metal oxides such as calcium oxide, barium oxide, iron oxide, copper oxide, titanium oxide, and aluminum oxide, metal silicate salts such as calcium silicate and aluminum silicate, metal carbides such as silicon carbide and tungsten carbide, metal nitrates such as titanium nitrate, aluminum nitrate, and boron nitrate, metal carbonate salts such as magnesium carbonate and calcium carbonate, metal sulfate salts such as calcium sulfate and barium sulfate, etc.), mineral materials (zeolite, diatomaceous earth, fired diatomaceous earth, active clay, alumina, silica, talc, mica, kaolin, sericite, bentonite, montmorillonite, smectite, clay, etc.), and the like. These fillers may be used alone or in combination of two or more kinds thereof. The shape of the filler is a particle shape, a plate shape, an infinite shape, or the like. The number-average primary particle diameter of the filler can be appropriately selected from the range of about from 10 nm to 10 μm depending on the kind. Of these fillers, carbonaceous materials such as carbon black and mineral materials such as silica, and the like are widely used and carbon black is preferred.

Since carbon black suppresses internal heat generation of the rubber composition forming the compression layer low to improve the fuel-saving performance, it is preferred to incorporate a carbon black having a large particle diameter, particularly a large-particle-diameter carbon black exhibiting an iodine adsorption amount of 40 mg/g or less. Examples of the large-particle-diameter carbon black include FEF, GPF, APF, SRF-LM, SRF-HM, and the like. These carbon blacks can be used alone or in combination of two or more kinds thereof. The number-average primary particle diameter of the large-particle-diameter carbon black may be about, for example, from 40 to 200 nm, preferably 45 to 150 nm, and further preferably 50 to 125 nm.

Since the large-particle-diameter carbon black exhibits a small reinforcing effect and is inferior in the abrasion resistance, it is preferred to use a small-particle-diameter carbon black (iodine adsorption amount is higher than 40 mg/g) having a small particle diameter and having a high reinforcing effect in combination. By using at least two kinds of carbon blacks having different particle diameters, the fuel-saving performance (effect owing to the large-particle-diameter carbon black) and the abrasion resistance (effect owing to the small-particle-diameter carbon black) can be both achieved. Examples of the small-particle-diameter carbon black include SAF, ISAF-HM, ISAF-LM, HAF-LS, HAF, HAF-HS, and the like. These carbon blacks can be used alone or in combination of two or more kinds thereof. The number-average primary particle diameter of the small-particle-diameter carbon black may be less than 40 nm, for example, about from 5 to 38 nm, preferably 10 to 35 nm, and further preferably 15 to 30 nm.

Incidentally, the proportion of the average particle diameter of the large-particle-diameter carbon black to the average particle diameter of the small-particle-diameter carbon black may be the former/the latter=about from 1.5/1 to 3/1, preferably from 1.7/1 to 2.7/1, and further preferably from 1.8/1 to 2.5/1.

Moreover, the mass proportion of the large-particle-diameter carbon black to the small-particle-diameter carbon black may be in a range where the fuel-saving performance and the abrasion resistance can be both achieved, for example, the former/the latter=about from 20/80 to 55/45, preferably 25/75 to 50/50, and further preferably 30/70 to 50/50. Of the carbon blacks, in the case where the ratio of the small-particle-diameter carbon black is too large, the internal heat generation (tan δ) of the rubber composition (compression layer) becomes large to decrease the fuel-saving performance and, in the case where the large-particle-diameter carbon black is too much, the abrasion resistance decreases due to insufficient reinforcement.

Examples of the reinforcing fibers include synthetic fibers such as polyolefin-based fibers (polyethylene fiber, polypropylene fiber, etc.), polyamide fibers (polyamide 6 fiber, polyamide 66 fiber, polyamide 46 fiber, aramid fiber, etc.), polyester fibers [$C_{2-4}$-alkylene-$C_{6-14}$-arylate-based fibers such as polyethylene terephthalate (PET) fiber and polyethylene naphthalate (PEN) fiber, etc.], vinylon fibers, and polyparaphenylene benzobisoxazole (PBO) fibers; natural fibers such as cotton, hemp, and wool; and inorganic fibers such as carbon fibers. These fibers may be used alone or in combination of two or more kinds thereof.

Of these short fibers, preferred is at least one kind selected from polyamide fibers such as aramid fiber, polyester fibers, vinylon fibers, and the like. The reinforcing fiber may be fibrillated.

The reinforcing fiber may be usually incorporated into the compression layer in a short fiber form, and the average length of the short fiber is, for example, from 0.1 to 20 mm, preferably from 0.5 to 15 mm, and more preferably from 1 to 10 mm and may be about from 1 to 5 mm (e.g., from 2 to 4 mm). The average fiber diameter of the reinforcing fiber is about, for example, from 1 to 100 μm, preferably from 3 to 50 μm, and further preferably from 5 to 40 μm (particularly from 10 to 30 μm).

The ratio of the reinforcing material may be 40 parts by mass or more relative to 100 parts by mass of the polymer component, and is about, for example, from 45 to 100 parts by mass, preferably from 50 to 90 parts by mass, and further preferably from 55 to 80 parts by mass (particularly from 60 to 70 parts by mass). In the present invention, even in the case where the ratio of the reinforcing material is large, torque loss can be reduced.

The ratio of the filler may be 10 parts by mass or more relative to 100 parts by mass of the polymer component, and is about, for example, from 20 to 100 parts by mass, preferably from 30 to 90 parts by mass, and further preferably from 35 to 80 parts by mass (particularly from 40 to 70 parts by mass).

The ratio of the reinforcing fiber may be 80 parts by mass or less (e.g., from 0 to 80 parts by mass) relative to 100 parts by mass of the polymer component, and is, for example, about 60 parts by mass or less (e.g., from 1 to 60 parts by mass), preferably 50 parts by mass or less (e.g., from 5 to 50 parts by mass), and further preferably 40 parts by mass or less (e.g., from 10 to 40 parts by mass). In the case where the ratio of the reinforcing fiber is too large, there is a concern that torque loss cannot be reduced.

(Other Additives or Blending Agents)

The compression layer may contain conventional additives or blending agents as required. Examples of the blending agents include vulcanizing agents or crosslinking agents [e.g., oximes (quinone dioxime, etc.), guanidines (diphenylguanidine, etc.), metal oxides (magnesium oxide, zinc oxide, etc.), organic peroxides (diacyl peroxides, peroxy esters, dialkyl peroxides, etc.), etc.], vulcanization aids, vulcanization accelerators, vulcanization retarders, plasticizers, softeners (oils such as paraffin oils and naphthenic oils, etc.), processing agents or processing aids (stearic acid, stearic acid metal salts, waxes, paraffins, etc.), anti-aging agents (aromatic amine-based, benzimidazole-based anti-aging agents, etc.), adhesion improving agents [resorcin-formaldehyde co-condensate, melamine resins such as hexamethoxymethylmelamine, co-condensates thereof (resorcin-melamine-formaldehyde co-condensates, etc.), etc.], colorants, tackifiers, coupling agents (silane coupling agents, etc.), stabilizers (antioxidants, UV absorbers, thermal stabilizers, etc.), lubricants, flame retardants, antistatic agents, and the like. These blending agents may be used alone or in combination of two or more kinds thereof, and they are appropriately selected and used depending on the kind, use, and performance of the polymer component.

In the present invention, thanks to the polyvinyl alcohol-based resin, a uniform water film can be formed on the frictional power transmission surface when exposed to water. Therefore, from the standpoint of an effect of reducing the torque loss, the compression layer preferably does not substantially contain a surfactant other than the polyvinyl alcohol-based resin, and the ratio of the surfactant other than the polyvinyl alcohol-based resin may be 10% by mass or less (particularly 1% by mass or less) relative to the whole rubber composition forming the compression layer and it is particularly preferred that the layer does not substantially (except unavoidable impurities) contain a surfactant other than the polyvinyl alcohol-based resin.

(Loss Tangent of Inside of Compression Layer)

The compression layer of the present invention preferably has low internal loss tangent or dielectric tangent (tan δ). The loss tangent (tan δ) is one obtained by dividing loss modulus (E'') by storage modulus (E'), is expressed as a ratio of energy dissipated (lost) as heat during 1 cycle of vibration to maximum energy to be stored, and becomes a measure of energy loss. That is, an index of dissipation of the vibration energy applied to the compression layer and dissipated as heat can be numerically represented by tan δ. Therefore, the smaller the tan δ is, the smaller the heat dissipated is (i.e., internal heat generation is decreased and the fuel-saving performance is improved). In a preferable embodiment of the present invention, focusing on tan δ at a temperature at which the belt is usually run (e.g., a temperature range of from 40 to 120° C.), the tan δ is set low. Specifically, for example, tan δ of the compression layer at 40° C. and at a frequency of 10 Hz can be selected from the range of about from 0.08 to 0.17 in order to improve the fuel-saving performance, and is about, for example, from 0.09 to 0.165, preferably from 0.095 to 0.16, and further preferably from 0.1 to 0.15 (particularly from 0.1 to 0.13).

[Surface Layer]

In the frictional power transmission belt of the present invention, the compression layer may have a surface layer containing a polyvinyl alcohol-based resin on the surface of the power transmission surface. The polyvinyl alcohol-based resin is soluble in water and, by the presence as the surface layer on the surface of the compression layer, the wettability of the frictional power transmission surface of the compression layer to water (affinity of the rubber to water) can be improved.

It is sufficient that the surface layer is laminated on the power transmission surface capable of coming into contact with pulleys but, in view of productivity and the like, the layer may be laminated on the whole surface of the compression rubber layer (whole exposed surface).

It is sufficient that the surface layer contains the aforementioned polyvinyl alcohol-based resin, but the layer is roughly classified into a surface layer formed of the polyvinyl alcohol-based resin (single layer) and a surface layer formed of a rubber composition containing the polyvinyl alcohol-based resin and the polymer component (composite layer).

As the polymer component in the composite layer, aforementioned ones may be mentioned. Moreover, the polyvinyl alcohol-based resin may be present in a particle form in the composite layer. In the case where the polyvinyl alcohol-based resin is present in a particle form, the particles can be substantially homogeneously dispersed and exposed without protrusion on the power transmission surface. Furthermore, in the composite layer, the dispersion form of the polyvinyl alcohol-based resin particles is not particularly limited and may be a form where particles partially exposed on the surface of the composite layer and particles completely buried in the composite layer are substantially homogeneously dispersed in a mixed manner, or may be a form where only particles partially exposed on the surface of the composite layer are substantially homogeneously dispersed. The former dispersion form can be easily prepared by transforming a rubber composition in which particles are dispersed beforehand, into a sheet, and the latter dispersion form can be easily prepared by partly attaching the particles onto the surface of the compression layer.

In the present invention, since the surface layer contains the polyvinyl alcohol-based resin, it is not necessary that an inner layer of the compression layer contains the polyvinyl alcohol-based resin. That is, the compression layer of the present invention may contain the polyvinyl alcohol-based resin only in the surface layer. In the case where the inner layer of the compression layer contains the polyvinyl alcohol-based resin, from the viewpoint that mechanical characteristics of the compression layer can be maintained, it is preferred that the inner layer contains the polyvinyl alcohol-based resin in a lower concentration than the surface layer.

Incidentally, the surface layer may appropriately contain reinforcing materials, other additives and blending agents, which are described above.

(Thickness of Surface Layer)

The thickness (average thickness) of the surface layer can be selected from a range of about from 1 to 1500 μm, and the thickness is about, for example, from 1 to 500 μm, preferably from 5 to 300 μm, and further preferably from 10 to 150 μm in the case of the single layer, and is about, for example, from 100 to 1,500 μm, preferably from 150 to 800 μm, and further preferably from 200 to 600 μm in the case of the composite layer. In the case where the thickness of the surface layer is too small, there is a concern that the effect of improving the sound generation resistance decreases and there is a concern that durability of the sound generation resistance also decrease. On the other hand, in the case where the thickness of the surface layer is too large, there is a concern that mechanical characteristics of the compression layer decrease.

In the present invention, the average thickness of the surface layer is determined by measuring the thickness through observation of cross-sections of the compression layer part of the frictional power transmission belt by using a scanning electron microscope and calculating an average value at 10 places for the surface layer containing the polyvinyl alcohol-based resin.

[Manufacturing Method of Belt]

The manufacturing method of the frictional power transmission belt of the present invention is not particularly limited and known or conventional methods can be employed. For example, the belt can be formed by laminating a compression layer, an adhesion layer in which a tension member is embedded, and a tension layer, each layer being formed of an unvulcanized rubber composition, molding the resulting laminate cylindrically in a molding mold, vulcanizing it to form a sleeve, and cutting the vulcanized sleeve into a predetermined width. More specifically, a V-ribbed belt can be manufactured by the following methods.

(First Manufacturing Method)

First, a sheet for a tension layer is wound on a cylindrical molding mold having a smooth surface, a cord (a twisted cord, etc.) forming a tension member is helically spun on the sheet, and further, a sheet for an adhesion layer and a sheet for a compression layer are sequentially wound thereon to prepare a molded article. Thereafter, a jacket for vulcanization is put on the molded article from the above to accommodate the mold (molding mold) in a vulcanization can and, after vulcanization is performed under predetermined vulcanization conditions, resulting one is released from the molding mold to obtain a cylindrical vulcanized rubber sleeve. Then, after the outer surface (compression layer) of the vulcanized rubber sleeve is polished with a grinding wheel to form a plurality of ribs, the vulcanized rubber sleeve is cut into a predetermined width along a belt longitudinal direction by using a cutter to finally form a V-ribbed belt. Incidentally, by reversing the cut belt, a V-ribbed belt containing a compression layer having rib parts on the inner circumferential surface can be obtained.

(Second Manufacturing Method)

First, a cylindrical inner mold having a flexible jacket mounted on the outer circumferential surface thereof is used as an inner mold. An unvulcanized sheet for a tension layer is wound on the flexible jacket on the outer circumferential surface, a cord forming a tension member is helically spun on the sheet, and further, an unvulcanized sheet for a compression layer is wound thereon to prepare a laminate. Next, a cylindrical outer mold where a plurality of rib molds are engraved on the inner circumferential surface thereof is used as an outer mold capable of being mounted on the inner mold. The inner mold on which the laminate has been wound is concentrically set in the outer mold. Thereafter, the flexible jacket is expanded toward the inner circumferential surface (rib molds) of the outer mold to press-fit the laminate (compression layer) against the rib molds, followed by vulcanization. Then, after the inner mold is taken out from the outer mold and the vulcanized rubber sleeve having a plurality of ribs is released from the outer mold, the vulcanized rubber sleeve is cut into a predetermined width along a belt longitudinal direction by using a cutter to finally form a V-ribbed belt. In this second manufacturing method, the sleeve (or V-ribbed belt) having a plurality of ribs can be finally formed by expanding the laminate having the tension layer, the tension member, and the compression layer at once.

(Third Manufacturing Method)

In connection with the second manufacturing method, for example, there may be adopted the method disclosed in JP-A-2004-82702 (a method in which only a compression layer is expanded to form a preform (semi-vulcanized state), then a tension layer and a tension member are expanded and press-bonded to the preform, and they are vulcanized and integrated to finally form a V-ribbed belt).

Of these manufacturing methods, preferred is the first manufacturing method in which the compression layer is polished and thus it is possible to make short fibers sufficiently protrude on the frictional power transmission surface. Incidentally, in the second and third manufacturing methods, since the ribs are formed by press-fitting the compression layer against the rib molds, the exposing amount of the polyvinyl alcohol-based resin decreases. But the polyvinyl alcohol-based resin may be made to expose by polishing or grinding the power transmission surface of the compression layer formed by these methods.

In the case where the compression layer has the surface layer containing the polyvinyl alcohol-based resin, as the manufacturing method of the frictional power transmission belt, there can be employed a method including a compression layer winding step of winding a unvulcanized rubber sheet on a cylindrical drum and a vulcanization and formation step of pushing the unvulcanized rubber sheet against a mold and vulcanizing the sheet, and the surface layer can be formed in either step of the compression layer winding step and the vulcanization and formation step.

Other than the process of forming the surface layer, any conventional method can be utilized without particular limitation as long as it is a forming method in a mold. Examples of the utilizable conventional method include a method including a cord spinning step of winding a cord on a cylindrical drum, a compression layer winding step of winding an unvulcanized rubber sheet on the wound cord, an vulcanization and formation step of pushing the cord and the unvulcanized rubber sheet against a mold (pressing them with the mold) and vulcanizing them. In the case where a tension layer and an adhesion layer are formed, the method may include, as a pre-step of the cord spinning step, a step of winding a member constituting the tension layer (rubber sheet or reinforcing cloth) and, if necessary, a rubber sheet forming the adhesion layer on the flexible jacket (bladder) fitted on a cylindrical molding drum, and a cord may be further spirally spun on the wound member. Specifically, the aforementioned second manufacturing method and third manufacturing method may be mentioned.

The process of forming the surface layer can be incorporated into either step of the compression layer winding step and the vulcanization and formation step in such conventional methods. For examples, there may be mentioned (1) a method of using a laminate sheet of an unvulcanized rubber layer (rubber composition) for forming the surface layer and an unvulcanized rubber layer for forming the compression layer, as the unvulcanized rubber sheet in the compression layer winding step, (2) a method of using a sheet obtained by applying polyvinyl alcohol-based resin particles on a surface of an unvulcanized rubber sheet for forming the compression layer, as the unvulcanized rubber sheet in the compression layer winding step, and (3) a method of using a mold coated with the polyvinyl alcohol-based resin on a contact surface with the unvulcanized rubber sheet, as the mold in the vulcanization and formation step.

In the method (1), the method for preparing the laminate sheet is not particularly limited and conventional methods can be utilized. For example, individual unvulcanized sheets prepared separately by rolling or the like may be laminated, or the sheet may be a laminate sheet formed by co-extrusion. In the method (1), usually, since the surface layer can be prepared from a rubber composition containing the polyvinyl alcohol-based resin, there can be easily formed a composite layer having a form where particles partially exposed on the surface and particles completely buried in the layer are substantially homogeneously dispersed in a mixed manner.

In the methods (2) and (3), as for the polyvinyl alcohol-based resin, the resin (resin particles) itself may be applied or attached, or a liquid composition in which the resin (resin particles) has been dispersed in a solvent may be applied.

Examples of the application method include conventional methods such as a coater method, a casting method, a dipping method, a spraying method, a spinner method, and the like. Of these methods, a coater method, a spraying method and the like are widely used. Incidentally, if necessary, a coating liquid may be applied a plurality of times.

Examples of the solvent constituting the liquid composition include general-purpose solvents such as water, alcohols (e.g., alkanols such as ethanol and isopropanol, etc.) hydrocarbons (e.g., aromatic hydrocarbons such as toluene and xylene), ethers (e.g., linear ethers such as diethyl ether; cyclic ethers such as dioxane and tetrahydrofuran), ketones (e.g., linear ketones such as acetone and methyl ethyl ketone; cyclic ketones such as cyclohexanone), esters (e.g., acetic acid esters such as ethyl acetate), cellosolves (methylcellosolve, ethylcellosolve, butylcellosolve, etc.), carbitols, and the like. These solvents may be used alone or as a mixed solvent. These solvents can be selected depending on uses and, for example, a homogeneous single layer may be formed by using water and/or an alcohol or a composite layer maintaining a particle shape may be formed by using another solvent.

In the methods (2) and (3), a single layer can be easily formed by increasing coating thickness or solid concentration in the liquid composition, and a composite layer having a form where only the resin particles partially exposed on the surface are substantially homogeneously dispersed can be easily formed by partly spraying the resin (resin particles) itself on the power transmission surface or decreasing the solid concentration in the liquid composition.

EXAMPLES

The following will explain the present invention in more detail based on Examples, but the present invention is not limited to these Examples. Incidentally, the followings show details of materials of the compression layer used in Examples and evaluation methods of measured evaluation items.

[Material of Compression Layer]

EPDM: "EPT2060M" manufactured by Mitsui Chemicals, Inc.

PVA-A: A completely saponified product of polyvinyl alcohol, saponification degree of from 98.7 to 99.7% by mol, viscosity-average polymerization degree of 1,700, "Denka Poval K-17C" manufactured by Denka Company Limited.

PVA-B: A partially saponified product of polyvinyl alcohol, saponification degree of from 86.5 to 89.5% by mol, viscosity-average polymerization degree of 600, "Denka Poval B-05S" manufactured by Denka Company Limited.

PVA-C: A hydrophobic group-modified product of polyvinyl alcohol, saponification degree of from 93.0 to 97.0% by mol, viscosity-average polymerization degree of 1,700, kind of hydrophobic group: alkyl group, "Denka Poval F-300S" manufactured by Denka Company Limited.

PVA-D: A completely saponified product of polyvinyl alcohol, saponification degree of 99% by mol or more, viscosity-average polymerization degree of 1,700, "Denka Poval K-177" manufactured by Denka Company Limited.

Ultrahigh molecular weight polyethylene (PE): "GUR4150" manufactured by Hexaindustry Company, average particle diameter of 80 μm, melting point of 135° C.

Fluororesin (PTFE): "Fluon G190" manufactured by Asahi Glass Co., Ltd., average particle diameter of 25 μm Stearic acid: "Stearic acid Tsubaki" manufactured by NOF Corporation Zinc oxide: "Zinc Oxide III" manufactured by Seido Chemical Industry Co., Ltd.

Surfactant: Polyoxyalkylene alkyl ether, "Newcol 2308-LY" manufactured by Nippon Nyukazai Co., Ltd.

Carbon black HAF: "SEAST 3" manufactured by Tokai Carbon Co., Ltd., average particle diameter of 28 nm Carbon black GPF: "SEAST V" manufactured by Tokai Carbon Co., Ltd., average particle diameter of 62 nm Talc: "RL217" manufactured by Fuji Talc Industrial Co., Ltd., median diameter of 20 μm Nylon short fiber: Nylon 66, average fiber diameter of 27 μm, average fiber length of 3 mm Cotton short fiber: Denim, average fiber diameter of 13 μm, average fiber length of 6 mm Vinylon short fiber: Average fiber diameter of 26 μm, average fiber length of 6 mm Organic peroxide: Dicumyl peroxide Co-crosslinking agent: Dibenzoyl quinone dioxime, "VULNOC DMG" manufactured by Ouchi Shinko Chemical Industrial Co., Ltd.

Anti-aging agent A: Diphenylamine-based anti-aging agent ("NOCRAC CD" manufactured by Ouchi Shinko Chemical Industrial Co., Ltd.)

Anti-aging agent B: Mercaptobenzimidazole-based anti-aging agent ("NOCRAC MB" manufactured by Ouchi Shinko Chemical Industrial Co., Ltd.)

Softener (paraffin oil): "Diana Process Oil" manufactured by Idemitsu Kosan Co., Ltd.

Organic peroxide: Dicumyl peroxide

[William Abrasion Amount]

Measurement was performed in accordance with JIS K6264 (1993) by using a vulcanized rubber sheet.

[Viscoelasticity (tan δ)]

A test piece was sampled from a vulcanized rubber sheet and was used as a test piece. The test piece has a thickness of 2.0 mm, a width of 4.0 mm, and a length of 40 mm. Then, the test piece was fixed to chucks of a viscoelasticity measuring apparatus ("VR-7121" manufactured by Ueshima Seisakusho Co., Ltd.) by chucking it at a distance between chucks of 15 mm, initial distortion (static distortion) of 2.0% was imparted thereto, and tan δ (loss tangent) at 25° C., 40° C., or 100° C. was determined at a frequency of 10 Hz, under a dynamic distortion of 1.0% (i.e., while imparting a distortion of ±1.0% in a longitudinal direction where the initial distortion of 2.0% was a central position or a reference position), at a temperature elevating rate of 1° C./min.

[Contact Angle]

The contact angle θ between the surface of the vulcanized rubber sheet and water (the angle formed by the tangent line of a water droplet with the surface) can be determined from the projection photograph of a water droplet when water is dropped to the surface, as illustrated in FIG. 3, from the following equation using the θ/2 method.

$$\theta = 2\theta_1 \quad (1)$$

$$\tan \theta_1 = h/r, \text{ thus } \theta_1 = \tan^{-1}(h/r) \quad (2)$$

(in the equations, $\theta_1$ is the angle of a straight line connecting the vertex with the end point of the water droplet (left end point in FIG. 3) with respect to the surface, h represents the height of the water droplet, and r represents the radius of the water droplet).

When the equation (2) is substituted into the equation (1), the following equation (3) is obtained.

$$\theta = 2 \tan^{-1}(h/r) \quad (3)$$

As for the measurement of the contact angle, r and h were measured from the projection photograph of the dropped water droplet by using a full automatic contact angle meter ("CA-W type" manufactured by Kyowa Interface Science Co., Ltd.) and the contact angle was calculated by using the equation (3). In the measurement, the contact angles immediately after water dropping (after 1 second) and after 60 seconds were calculated. The smaller contact angle θ indicates that the surface is more excellent in affinity to water.

[Friction Coefficient]

A disk-shaped test piece having a diameter of 8 mm and a thickness of 2 mm was sampled from a vulcanized rubber sheet, friction force was measured by using a pin-on-disk friction coefficient measuring apparatus, and a friction coefficient was calculated. Specifically, the test piece was pushed with a counter material (SUS 304) having a surface roughness Ra of 0.8 μm at a load of 2.192 kgf/cm², a friction force was measured at a friction rate of 0 to 2.0 m/sec. while pouring water to the test piece at a water amount of 30 ml/min only when measurement was performed, a slope (μ-V property) of the curve of the friction coefficient against the friction rate (a slip rate to the counter material) was calculated by the least squares method. Incidentally, the slope represents a change of the friction coefficient to the slip rate.

[6% Slip Abrasion]

A V-ribbed belt was laid over each pulley of a testing machine in which a driving pulley (a diameter of 80 mm), a driven pulley (a diameter of 80 mm), and a tension pulley (a diameter of 120 mm) had been arranged in this order, a belt winding angle to the tension pulley was set to 90°, and the belt was made to run for 24 hours under a room-temperature condition while the belt tension was automatically adjusted such that the number of rotation of the driving pulley was 3,000 rpm, the torque of the driven pulley was 9.8 N·m, and a belt slip ratio was 6%. Then, belt weight before and after the running test was measured, and an abrasion rate was calculated by dividing belt weight loss (belt weigh before the running test–belt weight after the running test) by the belt weight before the running test.

[Torque Loss (Transmission Loss)]

As illustrated in FIG. 4, a V-ribbed belt was laid over a two-axle running test machine composed of a driving (Dr.) pulley having a diameter of 55 mm and a driven (Dn.) pulley having a diameter of 55 mm, a predetermined initial tension was applied to the V-ribbed belt with a tension of 500 N/one belt, and a difference between driving torque and driven torque at the time when the driving pulley was rotated at 2,000 rpm under no load on the driven pulley was calculated as torque loss. Incidentally, the torque loss determined by this measurement includes torque loss caused by bearings of the test machine in addition to torque loss caused by the V-ribbed belt. Therefore, a metal belt (material: maraging steel) for which torque loss as a belt was considered to be substantially 0 was run beforehand, and a difference between driving torque and driven torque thereof was determined as torque loss caused by bearings (bearing loss). Then, a value obtained by subtracting the torque loss caused by bearings (bearing loss) from the torque loss calculated after running the V-ribbed belt (torque loss caused by both of the belt and the bearings) was determined as torque loss caused by the belt alone. Incidentally, the torque loss (bearing loss) is torque loss when the metal belt was made to run under the predetermined initial tension (e.g., in the case where the V-ribbed belt is made to run under an initial tension of 500 N/one belt, torque loss when the metal belt is made to run under this initial tension is the bearing loss). The smaller the torque loss of the V-ribbed belt is, more excellent the fuel-saving performance is.

[Sound Generation Limit Angle Test: Misalignment Sound Generation Test]

Misalignment sound generation evaluation test (sound generation limit angle) was conducted by using a testing machine in which a driving pulley (Dr.) having a diameter of 101 mm, an idler pulley (IDL1) having a diameter of 70 mm, a misalignment pulley (W/P) having a diameter of 120 mm, an idler pulley (IDL2) having a diameter of 70 mm, a tension pulley (Ten) having a diameter of 61 mm, and an idler pulley (IDL3) having a diameter of 70 mm had been arranged in this order, whose layout is illustrated in FIG. 5. An axis distance (span length) between the idler pulley (IDL1) and the misalignment pulley was set to 135 mm, and all of the pulleys were adjusted so as to locate on the same plane (angle of misalignment: 0°).

That is, a V-ribbed belt was laid over each pulley of the testing machine, and the belt was made to run with applying tension such that the number of rotation of the driving pulley was 1,000 rpm and belt tension was 6 kgf/Rib under room temperature condition while periodically (about 30 seconds intervals) pouring 5 cc of water to a frictional power transmission surface of the V-ribbed belt in the vicinity of an outlet of the driving pulley. When the belt was made to run under misalignment (shifting the misalignment pulley to the near side to each pulley), an angle (sound generation limit angle) at which sound generation (in the vicinity of an inlet of the misalignment pulley) occurs was determined. The larger the sound generation limit angle is, the more excellent the silence is. Incidentally, in general, a belt is dislocated press-vulcanized under vulcanization conditions of 165° C. and 30 minutes to prepare a vulcanized rubber sheet.

For the obtained vulcanized rubber sheets, the William abrasion amount and viscoelasticity (tan δ) were measured and the results are shown in Table 2. Moreover, the results of measuring the contact angle to water are shown in Table 2 and FIG. 6. Furthermore, the results of measuring the friction coefficient are shown in Table 2 and FIG. 7.

TABLE 2

| | | Comparative Example | | Example | | | | | |
|---|---|---|---|---|---|---|---|---|---|
| | | 1 | 2 | 1 | 2 | 3 | 4 | 5 | 6 |
| Composition (part by mass) | Rubber (EPDM) | 100 | 100 | 100 | 100 | 100 | 100 | 100 | 100 |
| | PVA-A (completely saponified) | — | — | 5 | 10 | 25 | — | — | — |
| | PVA-B (partially saponified) | — | — | — | — | — | 25 | — | — |
| | PVA-C (hydrophobic group-modified) | — | — | — | — | — | — | 25 | — |
| | PVA-D (completely saponified) | — | — | — | — | — | — | — | 25 |
| | Surfactant | 5 | — | — | — | — | — | — | — |
| | Stearic acid | 1 | 1 | 1 | 1 | 1 | 1 | 1 | 1 |
| | Zinc oxide | 5 | 5 | 5 | 5 | 5 | 5 | 5 | 5 |
| | Carbon black HAF | 60 | 60 | 60 | 60 | 60 | 60 | 60 | 60 |
| | Anti-aging agent A | 1 | 1 | 1 | 1 | 1 | 1 | 1 | 1 |
| | Anti-aging agent B | 1 | 1 | 1 | 1 | 1 | 1 | 1 | 1 |
| | Softener (paraffin oil) | 5 | 5 | 5 | 5 | 5 | 5 | 5 | 5 |
| | Co-crosslinking agent | 2 | 2 | 2 | 2 | 2 | 2 | 2 | 2 |
| | Organic peroxide | 4 | 4 | 4 | 4 | 4 | 4 | 4 | 4 |
| William abrasion amount [cc] | | 2.970 | 2.636 | 2.097 | 2.012 | 1.764 | 2.147 | 1.920 | 2.002 |
| tanδ (40° C.) | | 0.187 | 0.166 | 0.148 | 0.150 | 0.161 | 0.163 | 0.156 | 0.160 |
| E' (40° C.) [MPa] | | 11.7 | 16.2 | 14.9 | 15.2 | 17.8 | 16.9 | 17.6 | 17.9 |
| Contact angle to water [°] | After 1 second | 112 | 123 | 123 | 109 | 121 | 96 | 106 | 122 |
| | After 60 seconds | 69 | 117 | 108 | 101 | 108 | 68 | 89 | 109 |
| μ-V property (dry state) | | −0.081 | −0.065 | −0.049 | −0.054 | −0.058 | −0.054 | −0.024 | −0.057 |
| μ-V property (when exposed to water) | | −0.160 | −0.210 | −0.165 | −0.160 | −0.147 | −0.113 | −0.129 | −0.138 | from a pulley in the vicinity of 3° (i.e., rib dislocation), and the state that power is not properly transmitted occurs.

[Shape of Polyvinyl Alcohol Resin Particles]

The polyvinyl alcohol resin particles as a raw material were photographed at a magnification of 50 by using a scanning electron microscope ("VE-7800" manufactured by Keyence Corporation). Thereafter, particle diameter (long diameter and short diameter) of the polyvinyl alcohol resin particles was measured by using an image analyzing software, and the average particle diameter and aspect ratio of the polyvinyl alcohol resin particles were calculated. The results are shown in Table 1.

TABLE 1

| | PVA-A | PVA-B | PVA-C | PVA-D |
|---|---|---|---|---|
| Average particle diameter (μm) | 241 | 82 | 127 | 41 |
| Maximum particle diameter (μm) | 381 | 153 | 338 | 159 |
| Minimum particle diameter (μm) | 153 | 16 | 39 | 10 |
| Aspect ratio | 1.54 | 1.86 | 1.61 | 1.94 |

Comparative Examples 1 To 2 and Examples 1 to 5

The rubber compositions shown in Table 2 were rubber-kneaded by Banbury mixer, and the kneaded rubbers were passed through calender rolls to prepare unvulcanized rolled rubber sheets having a given thickness. After a predetermined size of the obtained sheet was sampled, it was As is apparent form the results of Table 2, the William abrasion amount was decreased in Examples 1 to 6 as compared with Comparative Examples.

Moreover, tan δ was decreased in Examples 1 to 6 as compared with the case of Comparative Example 1 (surfactant was blended). Incidentally, tan δ was slightly larger in Example 4 that in other Examples.

Furthermore, storage modulus was increased in Examples 1 to 6 as compared with the case of Comparative Example 1 in which a surfactant was blended. This shows that strength is not decreased even when polyvinyl alcohol (PVA) is blended and the results were also correlated to the results of the abrasion test.

Moreover, as is apparent from the results of Table 2 and FIG. 6, the contact angle to water was also smallest in Example 4 and the wettability was good.

Furthermore, as is apparent from the results of Table 2 and FIG. 7, the change in the friction coefficient (the slope of the μ-V curve) when exposed to water (WET) was smallest in Example 4. That is, in the sheet of Example 4, the friction state when exposed to water was most stable.

In addition, from the comparison between Example 3 and Example 6, in the completely saponified product of polyvinyl alcohol, the change in the friction coefficient (the slope of the μ-V curve) when exposed to water (WET) was smaller in Example 6 in which particles having a smaller particle diameter were used.

Comparative Examples 3 To 4 and Examples 7 to 15

The rubber compositions shown in Table 3 were rubber-kneaded by Banbury mixer, and the kneaded rubbers were passed through calender rolls to prepare unvulcanized rolled rubber sheets (sheets for a compression layer) having a given thickness. Moreover, by using rubber compositions that did not contain short fibers, surfactants, and polyvinyl alcohols (PVA) in the rubber compositions shown in Table 3, sheets for an adhesion layer and sheets for a tension layer were prepared in the same manner as in the case of the sheets for a compression layer.

Next, by using these sheets, belts were prepared in accordance with the first manufacturing method mentioned above. That is, first, the sheet for a tension layer was wound on a cylindrical molding mold having a smooth surface, a treated rope was helically spun on the sheet for a tension layer, and the sheet for an adhesion layer and the sheet for a compression layer were sequentially wound thereon to prepare a molded article. Thereafter, a jacket for vulcanization was put on the molded article from the above and the mold was accommodated in a vulcanization can. After vulcanization was performed under predetermined conditions, a vulcanized product was released from the molding mold to obtain a cylindrical vulcanized rubber sleeve. Then, after the outer surface (compression layer) of the vulcanized rubber sleeve was polished by a grinding wheel at given intervals to form a plurality of ribs, the vulcanized rubber sleeve was cut into a given width along a belt longitudinal direction by using a cutter to finally form a V-ribbed belt having 6 ribs in a width direction and an effective length of 1,100 mm.

Furthermore, a vulcanized rubber sheet and a test piece were prepared from the rubber composition sampled from the sheet for a compression layer, and 6% slip abrasion, belt torque loss and viscoelasticity (tan δ) were measured and the results are shown in Table 3. Moreover, the results of measuring the belt sound generation limit angle are shown in Table 3 and FIG. 8.

Moreover, transmission loss (torque loss) was smaller in Examples than in Comparative Example 3 in which a surfactant was blended and was similar to that of Comparative Example 4 in which PVA and a surfactant were not contained.

Furthermore, as is apparent from the results of Table 3 and FIG. 8, the sound generation limit angles of the belts of Examples 7 to 8 and 11 were high in both of the dry state (DRY) and the water-exposed state (WET) and thus the sound generation resistance was good. It is considered that this is because hydrophilicity is improved by the blending of PVA and thus the friction state is stabilized.

In addition, as is apparent from the results of Table 3, tan δ of Examples was smaller than that of Comparative Example 3 and was slightly larger than that of Comparative Example 4. That is, this fact shows that, even when PVA is blended, tan δ is not so increased as in the case where a surfactant is blended, and the results were also correlated to the results of the transmission loss.

Furthermore, as is apparent from the results of Table 3, storage modulus was increased in Examples as compared with the cases of Comparative Examples 3 and 4. That is, this fact shows that a decrease in strength does not occur even when PVA is blended, and the results were also correlated to the results of the abrasion test.

Moreover, as is apparent from the results of Examples, in the cases where the blending amount of PVA was large, the sound generation limit angle when exposed to water was increased and the sound generation resistance was excellent.

Comparative Examples 5 To 8 and Examples 16 to 20

[Preparation of Rubber Layer]

As a compression rubber layer and a surface layer, the rubber compositions shown in Table 4 were rubber-kneaded

TABLE 3

| | | Comparative Example | | Example | | | | | | | | |
|---|---|---|---|---|---|---|---|---|---|---|---|---|
| | | 3 | 4 | 7 | 8 | 9 | 10 | 11 | 12 | 13 | 14 | 15 |
| Composition (part by mass) | Rubber (EPDM) | 100 | 100 | 100 | 100 | 100 | 100 | 100 | 100 | 100 | 100 | 100 |
| | PVA-A (completely saponified) | — | — | — | — | — | — | — | 5 | 25 | — | — |
| | PVA-B (partially saponified) | — | — | 25 | — | 5 | — | — | — | — | — | — |
| | PVA-C (hydrophobic group-modified) | — | — | — | 10 | — | 5 | 25 | — | — | — | — |
| | PVA-D (completely saponified) | — | — | — | — | — | — | — | — | — | 5 | 25 |
| | Surfactant | 5 | — | — | — | — | — | — | — | — | — | — |
| | Carbon black HAF | 30 | 20 | 20 | 20 | 20 | 20 | 20 | 20 | 20 | 20 | 20 |
| | Carbon black GPF | 30 | 20 | 20 | 20 | 20 | 20 | 20 | 20 | 20 | 20 | 20 |
| | Stearic acid | 1 | 1 | 1 | 1 | 1 | 1 | 1 | 1 | 1 | 1 | 1 |
| | Zinc oxide | 5 | 5 | 5 | 5 | 5 | 5 | 5 | 5 | 5 | 5 | 5 |
| | Nylon short fiber | 20 | 20 | 20 | 20 | 20 | 20 | 20 | 20 | 20 | 20 | 20 |
| | Vinylon short fiber | 5 | 5 | 5 | 5 | 5 | 5 | 5 | 5 | 5 | 5 | 5 |
| | Anti-aging agent A | 1 | 1 | 1 | 1 | 1 | 1 | 1 | 1 | 1 | 1 | 1 |
| | Anti-aging agent B | 1 | 1 | 1 | 1 | 1 | 1 | 1 | 1 | 1 | 1 | 1 |
| | Softener (paraffin oil) | 5 | 5 | 5 | 5 | 5 | 5 | 5 | 5 | 5 | 5 | 5 |
| | Co-crosslinking agent | 2 | 4 | 4 | 4 | 4 | 4 | 4 | 4 | 4 | 4 | 4 |
| | Organic peroxide | 4 | 4 | 4 | 4 | 4 | 4 | 4 | 4 | 4 | 4 | 4 |
| 6% Slip abrasion amount [%] | | 0.85 | 0.65 | 0.58 | 0.59 | 0.64 | 0.62 | 0.56 | 0.60 | 0.53 | 0.63 | 0.57 |
| Torque loss [Nm] | | 0.34 | 0.29 | 0.30 | 0.28 | 0.29 | 0.29 | 0.27 | 0.29 | 0.28 | 0.29 | 0.28 |
| Sound generation limit angle in dry state [°] | | 2.0 | 2.0 | 2.3 | 2.3 | 2.1 | 2.1 | 2.4 | 2.0 | 2.3 | 2.0 | 2.3 |
| Sound generation limit angle when exposed to water [°] | | 2.6 | 1.1 | 2.7 | 3.0 | 1.8 | 2.1 | 3.5 | 1.2 | 1.6 | 1.5 | 2.4 |
| tan δ (40° C.) | | 0.145 | 0.094 | 0.121 | 0.103 | 0.099 | 0.097 | 0.110 | 0.097 | 0.111 | 0.098 | 0.118 |
| E' (40° C.) [MPa] | | 19.6 | 22.2 | 31.6 | 25.6 | 22.4 | 24.2 | 32.3 | 23.1 | 31.3 | 22.1 | 32.3 |

As is apparent from the results of Table 3, 6% slip abrasion amount was decreased in Examples as compared with the cases of Comparative Examples.

by Banbury mixer, and the kneaded rubbers were passed through calender rolls to prepare unvulcanized rolled rubber sheets having a given thickness. After a given size of the obtained sheets was sampled, it was press-vulcanized under vulcanization conditions of 165° C. and 30 minutes to prepare vulcanized rubber sheets.

For the obtained vulcanized rubber sheets, the contact angle to water, the friction coefficient, the μ-V property (change in the friction coefficient to the slip rate), and the William abrasion amount were measured and the results are shown in Table 4.

supply port and a top board and, after a cord was spirally wound on the outer circumferential surface of the sheet for an adhesion rubber layer, the sheet for a compression rubber layer was further wound on the cord to mount the belt sleeve on the mold.

Furthermore, the mold on which the belt sleeve had been wound was set in a vulcanization mold and, while heating with a heating/cooling jacket fitted with a heating/cooling

TABLE 4

| | | Compression rubber layer | Surface layer | | | | | | |
|---|---|---|---|---|---|---|---|---|---|
| | | A | B | C | D | E | F | G | H |
| Composition (part by weight) | Rubber (EPDM) | 100 | 100 | 100 | 100 | 100 | 100 | 100 | 100 |
| | PVA-A (completely saponified) | — | 5 | 10 | 25 | — | — | — | — |
| | PVA-B (partially saponified) | — | — | — | — | 25 | — | — | — |
| | PVA-C (hydrophobic group-modified) | — | — | — | — | — | 25 | — | — |
| | PVA-D (completely saponified) | — | — | — | — | — | — | 25 | — |
| | Ultrahigh molecular weight PE | — | — | — | — | — | — | — | 20 |
| | Stearic acid | 1 | 1 | 1 | 1 | 1 | 1 | 1 | 1 |
| | Zinc oxide | 5 | 5 | 5 | 5 | 5 | 5 | 5 | 5 |
| | Carbon black HAF | 60 | 60 | 60 | 60 | 60 | 60 | 60 | 60 |
| | Anti-aging agent A | 1 | 1 | 1 | 1 | 1 | 1 | 1 | 1 |
| | Anti-aging agent B | 1 | 1 | 1 | 1 | 1 | 1 | 1 | 1 |
| | Softener (paraffin oil) | 5 | 5 | 5 | 5 | 5 | 5 | 5 | 5 |
| | Co-crosslinking agent | 2 | 2 | 2 | 2 | 2 | 2 | 2 | 2 |
| | Organic peroxide | 4 | 4 | 4 | 4 | 4 | 4 | 4 | 4 |
| Contact angle to water [°] | After 1 second | 123 | 123 | 109 | 121 | 96 | 109 | 122 | 124 |
| | After 60 seconds | 117 | 108 | 101 | 108 | 68 | 89 | 109 | 119 |
| Friction coefficient (in dry state) | | 0.535 | 0.51 | 0.51 | 0.489 | 0.483 | 0.449 | 0.487 | 0.061 |
| Friction coefficient (when exposed to water) | | 0.224 | 0.194 | 0.188 | 0.183 | 0.151 | 0.149 | 0.178 | 0.024 |
| μ-V property (dry state) | | −0.065 | −0.049 | −0.054 | −0.058 | −0.054 | −0.024 | −0.057 | −0.009 |
| μ-V property (when exposed to water) | | −0.21 | −0.165 | −0.16 | −0.147 | −0.113 | −0.129 | −0.138 | −0.021 |
| William abrasion amount [cc] | | 2.636 | 2.097 | 2.012 | 1.764 | 2.147 | 1.92 | 2.002 | 1.513 |

As is apparent from the results of Table 4, in the rubber compositions B to G in which PVA resin particles were blended, wettability to water was improved and the change in friction coefficient (slope of the μ-V curve) was decreased as compared with the case of the rubber composition A containing no PVA resin particles.

On the other hand, the rubber composition H is excellent in the abrasion resistance and the μ-V property is smaller than that of the other compositions but, since the friction coefficient itself is very small, it is considered that power transmission performance decreases in the case where it is used for the power transmission surface of the belt. Furthermore, since the rubber composition G exhibits a large contact angle (poor water wettability), it is considered that the sound generation resistance when exposed to water is decreased.

Comparative Example 5

The rubber composition A of Table 4 was rubber-kneaded by Banbury mixer, and the kneaded rubber was passed through calender rolls to prepare an unvulcanized rolled rubber sheet (sheet for a compression rubber layer) having a thickness of 2.3 mm. Also, by using the rubber composition A, a sheet for an adhesion rubber layer having a thickness of 0.3 mm and a sheet for a tension layer having a thickness of 0.5 mm were prepared in the same manner as in the case of the sheet for a compression rubber layer.

Next, by using these sheets, a belt was prepared in accordance with the aforementioned manufacturing method. That is, the sheet for a tension rubber layer and the sheet for an adhesion rubber layer were sequentially wound on the outer circumference of a bladder of a mold containing an air medium inlet port, vulcanization was performed by expanding the bladder to push and pressurize the belt sleeve against the inner circumferential surface of the vulcanization mold. Conditions for vulcanization were set to 165° C., 1.0 MPa, and 30 minutes. At this time, grooves were formed on the outer circumference of the belt sleeve by biting of a concavo-convex part for molding of the vulcanization mold into the belt sleeve from the outer circumference thereof.

Next, the mold was removed from the vulcanization mold and, after the vulcanized belt sleeve remaining in the vulcanization mold was cooled with the heating/cooling jacket, the vulcanized belt sleeve was taken out from the vulcanization mold. Then, the vulcanized belt sleeve was cut in a manner of round slice by a cutter, to obtain a V-ribbed belt having a rib number of 6 in a width direction and an effective length of 1,100 mm.

Comparative Example 6

A V-ribbed belt was obtained in the same manner as in Comparative Example 5 except that, after the sheet for a compression rubber layer was wound on, talc was sprayed under a condition of a spraying amount of 100 g/m$^2$ by using a powder coating apparatus and the sheet was wound on the cord so that the side to which talc had been attached was located outside. A surface layer formed of talc (single layer) was laminated on the surface of the compression rubber layer of the obtained V-ribbed belt.

Comparative Example 7

A V-ribbed belt was obtained in the same manner as in Comparative Example 6 except that a fluororesin was used instead of talc. A surface layer formed of the fluororesin (single layer) was laminated on the surface of the compression rubber layer of the obtained V-ribbed belt.

Comparative Example 8

A laminated sheet was obtained by overlaying sheets formed by rolling the rubber composition A and the rubber composition H separately on a rolling mill (thickness of the sheet formed by rolling the rubber composition A: 1.7 mm, thickness of the sheet formed by rolling the rubber composition H: 0.6 mm). A V-ribbed belt was obtained in the same manner as in Comparative Example 5 except that the laminated sheet was wound on the cord so that the layer formed of the rubber composition H was located outside.

Example 16

A V-ribbed belt was obtained in the same manner as in Comparative Example 8 except that the rubber composition E was used instead of the rubber composition H.

Example 17

A V-ribbed belt was obtained in the same manner as in Comparative Example 8 except that the rubber composition F was used instead of the rubber composition H.

Example 18

A V-ribbed belt was obtained in the same manner as in Comparative Example 8 except that the rubber composition D was used instead of the rubber composition H.

Example 19

A V-ribbed belt was obtained in the same manner as in Comparative Example 8 except that the rubber composition G was used instead of the rubber composition H.

Example 20

A V-ribbed belt was obtained in the same manner as in Comparative Example 6 except that PVA-B was used instead of talc. A surface layer formed of polyvinyl alcohol (single layer) was laminated on the surface of the compression rubber layer of the obtained V-ribbed belt.

Table 5 shows the results of measuring the sound generation limit angles of the belts obtained in Comparative Examples 5 to 8 and Examples 16 to 20.

As is apparent from the results of Table 5, in Examples 16 to 20 in which the surface layer contained polyvinyl alcohol, the sound generation limit angles when exposed to water were high as compared with the cases of Comparative Examples 5 to 8 and thus the sound generation resistance was improved.

Contrarily, in Comparative Examples 6 to 8 in which the surface layer contained particles other than polyvinyl alcohol and in Comparative Example 5 in which no particle was contained, the sound generation limit angles when exposed to water were small as compared with the cases of Examples 16 to 20 and thus the sound generation resistance was poor.

While the present invention has been described in detail and with reference to specific embodiments thereof, it will be apparent to one skilled in the art that various changes and modifications can be made therein without departing from the spirit and scope of the present invention.

The present application is based on Japanese Patent Application No. 2014-223772 filed on Oct. 31, 2014, Japanese Patent Application No. 2014-262804 filed on Dec. 25, 2014, and Japanese Patent Application No. 2015-208209 filed on Oct. 22, 2015 and the contents thereof are incorporated herein by reference.

INDUSTRIAL APPLICABILITY

The frictional power transmission belt of the present invention can be used as various belts for which sound generation resistance is required, for example, as a frictional power transmission belt such as a V-belt or a V-ribbed belt. Furthermore, the frictional power transmission belt of the present invention can improve quietness when exposed to water, and therefore can be also preferably used in a transmission apparatus used outdoor, such as automobiles, motorcycles, and farm machines.

DESCRIPTION OF REFERENCE NUMERALS AND SIGNS

1: Tension member
2: Compression layer
3: Rib
4: Adhesion layer
5: Tension layer
6: Surface layer

The invention claimed is:
1. A frictional power transmission belt comprising a compression layer having a power transmission surface, at least a part of which is capable of coming into contact with a pulley, wherein the compression layer comprises a poly-

TABLE 5

|  | Comparative Example | | | | Example | | | | |
| --- | --- | --- | --- | --- | --- | --- | --- | --- | --- |
|  | 5 | 6 | 7 | 8 | 16 | 17 | 18 | 19 | 20 |
| Kind of particles added in surface layer | — | talc | PTFE | Ultrahigh molecular weight PE | PVA-B | PVA-C | PVA-A | PVA-D | PVA-B |
| Kind of rubber composition of surface layer (composite layer) | — | — | — | H | E | F | D | G | — |
| Rubber composition of compression rubber layer | A | A | A | A | A | A | A | A | A |
| Sound generation limit angle (°) in dry state | 2 | 2.2 | 2.5 | 2.6 | 2.3 | 2.3 | 2.3 | 2.3 | 2.2 |
| Sound generation limit angle (°) when exposed to water | 1.1 | 1.3 | 1.4 | 1.6 | 2.7 | 3 | 1.8 | 2.4 | 2.5 | mer component and a polyvinyl alcohol-based resin, wherein the polyvinyl alcohol-based resin is polyvinyl alcohol-based resin particles.

2. The frictional power transmission belt according to claim 1, wherein the compression layer has a surface layer comprising the polyvinyl alcohol-based resin on the surface of the power transmission surface.

3. The frictional power transmission belt according to claim 2, wherein the surface layer is formed of a rubber composition containing the polymer component and the polyvinyl alcohol-based resin.

4. The frictional power transmission belt according to claim 2, wherein the surface layer is formed of the polyvinyl alcohol-based resin.

5. The frictional power transmission belt according to claim 2, wherein the compression layer comprises the polyvinyl alcohol-based resin only in the surface layer.

6. The frictional power transmission belt according to claim 1, wherein the polyvinyl alcohol-based resin particles have an average aspect ratio of 10 or less.

7. The frictional power transmission belt according to claim 1, wherein a vinyl alcohol unit of the polyvinyl alcohol-based resin has a saponification degree of from 86 to 97% by mol.

8. The frictional power transmission belt according to claim 1, wherein the polyvinyl alcohol-based resin has a viscosity-average polymerization degree of from 300 to 3,500.

9. The frictional power transmission belt according to claim 1, wherein the polyvinyl alcohol-based resin has a melting point higher than vulcanization temperature of the belt.

10. The frictional power transmission belt according to claim 1, wherein the polyvinyl alcohol-based resin has a solubility in water of 60% by mass or higher at 20° C.

11. The frictional power transmission belt according to claim 1, wherein the polyvinyl alcohol-based resin is polyvinyl alcohol-based resin particles modified with a hydrophobic group.

12. The frictional power transmission belt according to claim 1, wherein in the compression layer, the ratio of the polyvinyl alcohol-based resin is from 5 to 30 parts by mass relative to 100 parts by mass of the polymer component.

13. The frictional power transmission belt according to claim 1, wherein the polyvinyl alcohol-based resin is dispersed and exposed on the frictional power transmission surface.

14. The frictional power transmission belt according to claim 1, wherein the compression layer further comprises a reinforcing material.

15. The frictional power transmission belt according to claim 1, wherein the polymer component is an ethylene-α-olefin elastomer.

16. The frictional power transmission belt according to claim 1, further comprising a tension member and a tension layer forming a belt back face, wherein the compression layer is formed on one surface of the tension layer, and the tension member is embedded along a belt longitudinal direction between the tension layer and the compression layer.

17. The frictional power transmission belt according to claim 1, which is a V-ribbed belt.

18. A manufacturing method of the frictional power transmission belt described in claim 2, comprising:
   a compression layer winding step of winding an unvulcanized rubber sheet on a cylindrical drum, and
   a vulcanization and formation step of pushing the unvulcanized rubber sheet against a mold and vulcanizing the sheet,
   wherein the surface layer is formed in either step of the compression layer winding step and the vulcanization and formation step.

19. The manufacturing method according to claim 18, wherein in the compression layer winding step, a lamination sheet of an unvulcanized rubber layer for forming the surface layer and an unvulcanized rubber layer for forming the compression layer is used as the unvulcanized rubber sheet.

20. The manufacturing method according to claim 18, wherein in the compression layer winding step, a sheet obtained by applying polyvinyl alcohol-based resin particles on a surface of an unvulcanized rubber sheet for forming the compression layer is used as the unvulcanized rubber sheet.

21. The manufacturing method according to claim 18, wherein in the vulcanization and formation step, a mold obtained by applying polyvinyl alcohol-based resin particles on a surface to be contact with the unvulcanized rubber sheet is used as the mold.

* * * * *